(12) United States Patent
Takeuchi et al.

(10) Patent No.: US 7,404,008 B2
(45) Date of Patent: Jul. 22, 2008

(54) ADDRESS TRANSLATOR AND METHOD FOR MANAGEMENT OF ADDRESS TRANSLATION RULES

(75) Inventors: Keisuke Takeuchi, Kunitachi (JP); Tetsuhiko Hirata, Yokohama (JP); Hiroaki Nakazawa, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 1031 days.

(21) Appl. No.: 10/644,009

(22) Filed: Aug. 20, 2003

(65) Prior Publication Data

US 2004/0103212 A1 May 27, 2004

(30) Foreign Application Priority Data

Nov. 26, 2002 (JP) ............................. 2002-341667

(51) Int. Cl.
G06F 15/16 (2006.01)
(52) U.S. Cl. ...................... 709/245; 709/238; 709/245; 370/392; 370/466
(58) Field of Classification Search ................ 709/245, 709/242, 238, 225, 227–228, 230; 370/392–393, 370/466, 389, 400
See application file for complete search history.

(56) References Cited

U.S. PATENT DOCUMENTS

| | | | |
|---|---|---|---|
| 6,615,357 B1 * | 9/2003 | Boden et al. ................. 709/238 |
| 6,629,149 B1 * | 9/2003 | Fraser et al. ................. 709/245 |
| 6,708,219 B1 * | 3/2004 | Borella et al. ............... 709/245 |
| 6,832,322 B1 * | 12/2004 | Boden et al. .................. 726/15 |
| 6,886,103 B1 * | 4/2005 | Brustoloni et al. .......... 713/160 |
| 6,934,763 B2 * | 8/2005 | Kubota et al. .............. 709/245 |
| 7,027,582 B2 * | 4/2006 | Khello et al. ............... 370/389 |
| 7,068,600 B2 * | 6/2006 | Cain ....................... 370/230.1 |
| 7,085,267 B2 * | 8/2006 | Carey et al. ................. 370/389 |
| 7,206,312 B2 * | 4/2007 | Kong ......................... 370/401 |
| 7,233,995 B2 * | 6/2007 | Yamaguchi et al. ......... 709/245 |
| 2004/0001509 A1 * | 1/2004 | Zhang et al. ................ 370/466 |
| 2004/0076180 A1 * | 4/2004 | Satapati et al. ............. 370/389 |

OTHER PUBLICATIONS

U.S. Appl. No. 10/061,331, filed Feb. 4, 2002, entitled "Address Translation Method".

(Continued)

*Primary Examiner*—Philip B Tran
(74) *Attorney, Agent, or Firm*—Mattingly, Stanger, Malur & Brundidge, P.C.

(57) ABSTRACT

There is provided an address translator having the functions to prevent, in the communications via the address translation, transmission of packets having no correct destination and transmission source addresses which will cause troubles in the networks and to urge an administrator take adequate measures for reception of the relevant packets. This address translator stores discriminator to discriminate temporary addresses. Moreover, when the original address is registered as the temporary address at the time of assignment of the temporary address of the receiving side host started when the name solution is performed, assignment is rejected to prevent transmission of packet from the transmitting side host by returning a response for name solution error to the transmitting side host. In addition, when transmission source address before translation and destination address after translation are registered as the temporary address, the received packet is discarded. Moreover, assignment of the temporary address is rejected and the packet is discarded, a message is transmitted to an alarm device or external host to notifying the event to an administrator.

20 Claims, 17 Drawing Sheets

OTHER PUBLICATIONS

E. Nordmark, Sun Microsystems, Feb. 2000, IETF RFC2765, Stateless IP/ICMP Translation Algorithm (SIIT).

G. Tsirtsis, et al., Campio Communications, Feb. 2000, IETF RFC2766, "Network Address Translation—Protocol Translation (NAT-PT)".

H. Kitamura, NEC Corporation, Apr. 2001, IETF RFC 3089, "A Socks-based IPv6/IPv4 Gateway Mechanism.".

J. Hagino, et al., IIJ Research Laboratory, Jun. 2001, IETF RFC3142, 9"An IPv6-to IPv4 Transport Relay Translator".

P. Mockapetris, ISI, Nov. 1987, IETF RFC1034, "Domain Names-Concepts and Facilities".

S. Thomson et al., Inria, Dec. 1995, IETF RFC1886, "DNS Extensions to support IP version 6".

\* cited by examiner

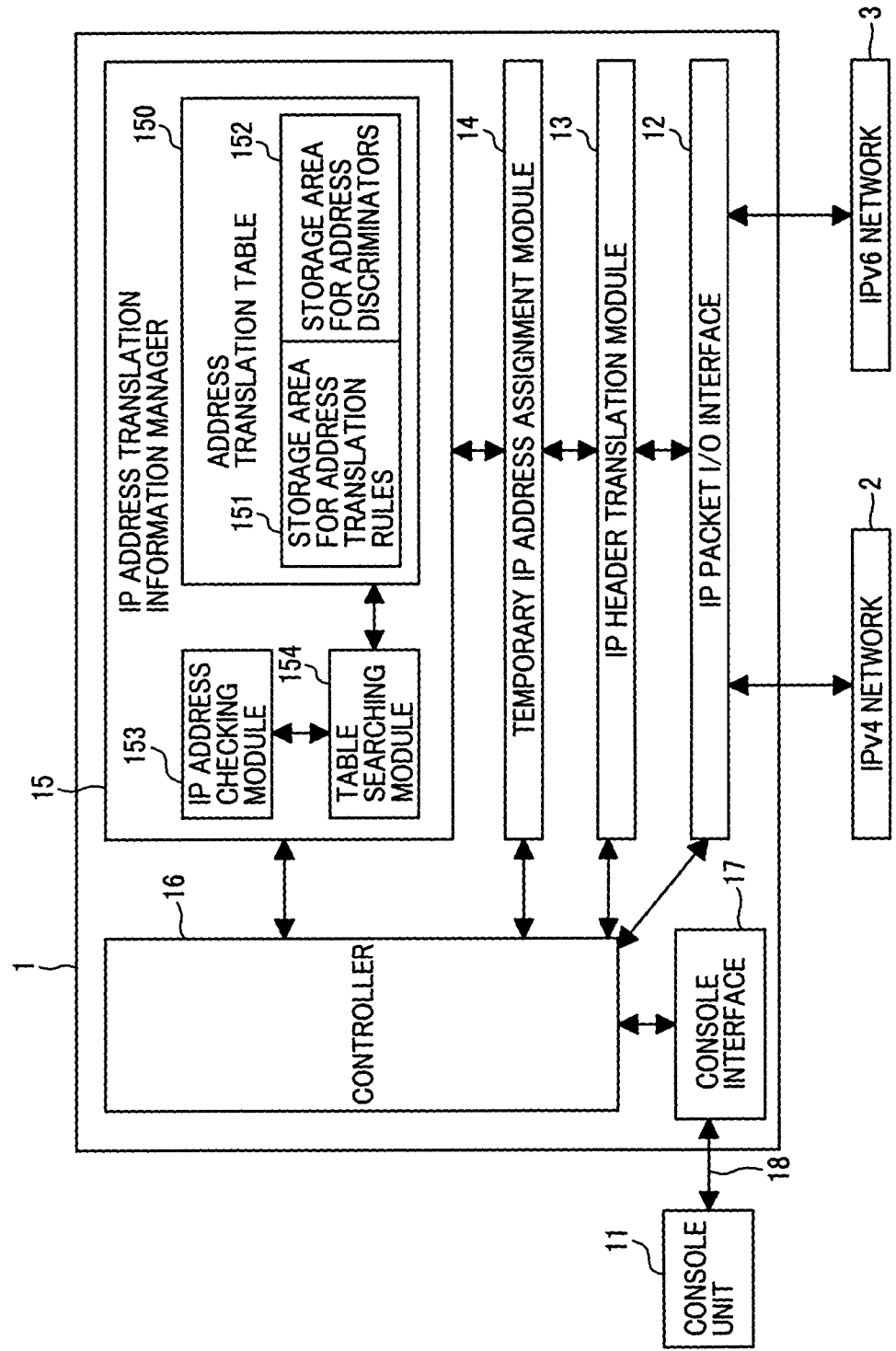

FIG.13

ADDRESS TRANSLATION RULES

| No. | IPv4 ADDRESS VALID IN NETWORK 2 ONLY | ATTRIBUTE | IPv6 ADDRESS | ATTRIBUTE | IPv4 ADDRESS VALID IN NETWORK 4 ONLY | ATTRIBUTE |
|---|---|---|---|---|---|---|
| 1 | 133.11.98.1 | 0 | 2001:1::c0a8:0101 | 0 | 192.168.1.1 | 1 |
| 2 | 133.144.10.1 | 1 | 3ffe:1::8590:0a01 | 0 | 192.168.100.1 | 0 |
| 3 | 133.11.98.2 | 0 | 2001:1::c0a8:0102 | 0 | 192.168.1.2 | 1 |
| ... | ... | | ... | | ... | ... |
| n | | | | | | |

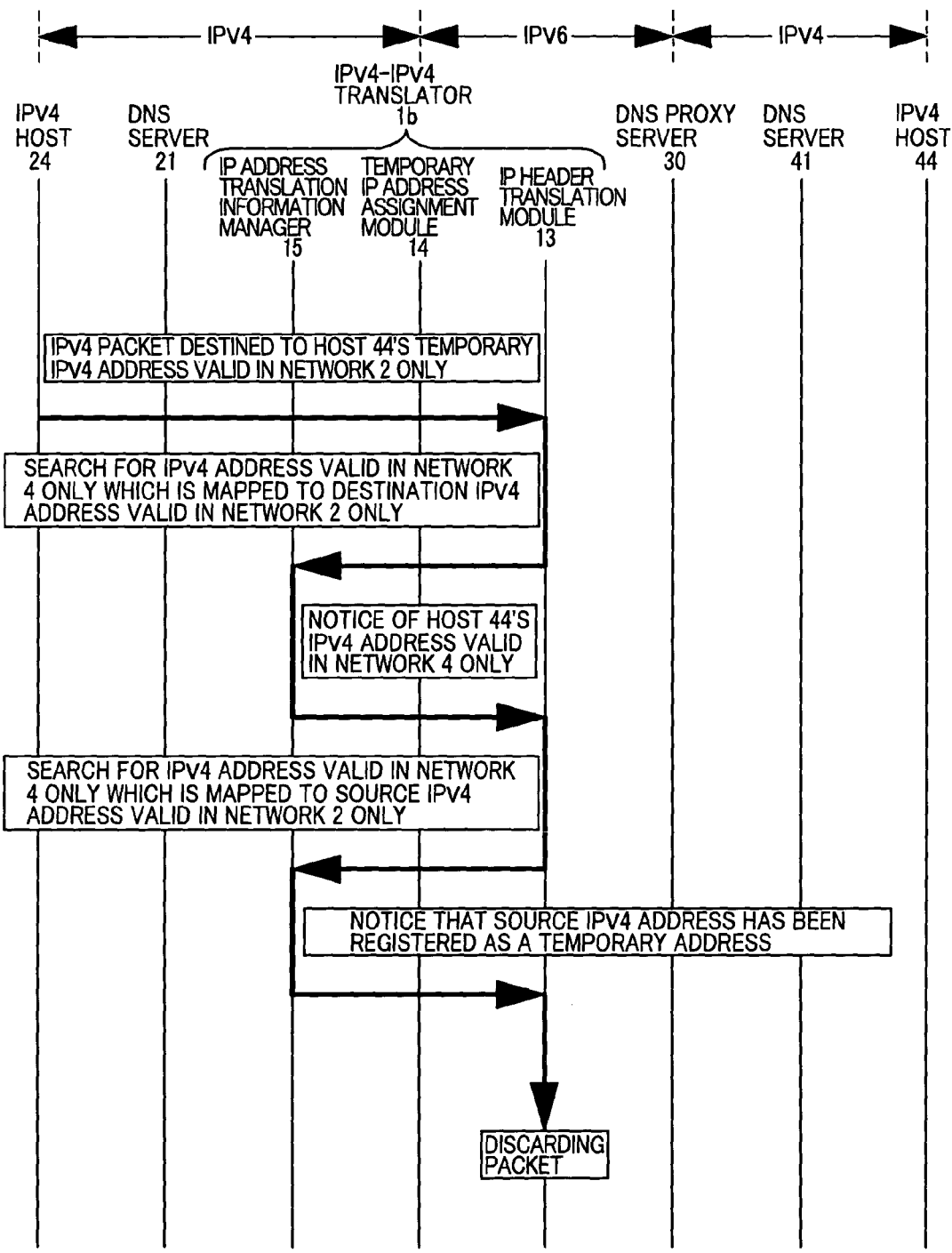

ADDRESS TRANSLATOR AND METHOD FOR MANAGEMENT OF ADDRESS TRANSLATION RULES

BACKGROUND OF THE INVENTION

The present invention relates to an address translator for effecting mutual connection among a plurality of communication networks in which address translation is required for discrimination of hosts for mutual communication.

Protocol translation is a known technology which is used to realize communication between a network to which a certain host belongs and a network to which a communication partner belongs under the condition that different communication protocols are used in these networks. For example, as an Internet Protocol (hereinafter referred to as "IP"), the Internet Protocol version 4 (hereinafter, referred to as "IPv4") is used at present at the every location in the world. However, the is now a concern that there may be a shortage of available addresses and therefore, an the Internet Protocol version 6 (hereinafter referred to as "IPv6") has been proposed in order to solve this problem.

However, since it is substantially impossible to directly shift the Internet Protocol to IPv6 from IPv4, introduction of a system to connect a network using IPv4 and a network using IPv6 through protocol translation has also been proposed. As an example of practical translation systems, the NAT-PT, which is described in the RFCs (Request For Comments) 2765 and 2766, published from the IETF (Internet Engineering Task Force), and the SOCKS64, which is described in the RFC3089, and the transport relay, which is described in the RFC3142, or the like are known.

These translation systems are basically intended to translate the formats of an IP packet between IPv4 and IPv6. In this case, since address translation is also performed between IPv4 and IPv6, it is necessary to generate a translation rule for the IPv4 address and the IPv6 address before the translation and then maintain the address translation rule. This translation rule is previously set statically in some cases, or it is created dynamically for each generation of a communication. In the latter case, a name resolution of the DNS (Domain Name System) is utilized to start generation of the translation rule.

The DNS is a system used to translate names which are written as a string of characters for easier understanding by people into IP addresses. The operation to translate the names into IP addresses is called name resolution. At present, almost all applications on the Internet obtain the IP addresses of a communication partner by utilizing this DNS.

The IPv4-IPv6 translator always monitors the messages of the DNS that are exchanged to start a communication by utilizing this fact, and it generates the IP address translation rule when the name resolution request message is issued. The practical operations involved in such a communication will be described below, considering the example of a communication that has originated toward an IPv4 host from an IPv6 host.

First, an IPv6 host inquires as to an IPv6 address of the receiving side host from a DNS proxy server. Next, the DNS proxy server also sends an inquiry to the other DNS servers and receives, as a response to this request, the address of the receiving side host. When the received address is the IPv4 address, the DNS proxy server updates the IPv4 address in the response message to a temporary IPv6 address, and then it returns this temporary IPv6 address to the IPv6 host. In this case, the IPv4-IPv6 translator, in cooperation with the DNS proxy server, generates the address translation rule under the correspondence between the IPv4 address before updating and the updated temporary IPv6 address and, thereafter, stores this rule within the server.

The transmitting side IPv6 host transmits IPv6 packets to the temporary IPv6 address of the receiving side host identified by the name solution of the DNS, as described above. At this time, the source address of packets is the IPv6 address of the transmitting side host itself. These IPv6 packets are first received by the IPv4-Ipv6 translator.

Upon reception of the IPv6 packet, the IPv4-IPv6 translator searches first for the IPv4 address corresponding to the destination IPv6 address of the IPv6 packets from a table storing the address translation rule (hereinafter, referred to as the "address translation table"). At this time, since the destination address translation rule is already generated by the name resolution of the is DNS, the object IPv4 address can be obtained.

Next, the IPv4-IPv6 translator searches for the IPv4 address corresponding to the IPv6 address of the transmission source of the IPv6 packets from the address translation table. However, since the translation rule of the transmission source address has not yet been generated at this time, the object IPv4 address cannot be obtained. Therefore, the address translator newly assigns a temporary IPv4 address for the IPv6 address of the transmitting side host and then generates the address translation rule through correspondence between these two addresses and also registers it in the address translation table.

When the translation rule of the transmission source address is generated and the IPv4 address corresponding, respectively, to the transmission source and destination can be obtained, the IPv6 packets are translated to the IPv4 packets, where the transmission source and destination addresses are updated respectively to the corresponding IPv4 address, they and are then transmitted toward the destination. Thereafter, since the translation rule of the transmission source address and destination address is already generated for the packets transmitted between both hosts, the packet translation is performed with reference to the translation rule.

Here, the address translation rule which is generated dynamically is only a temporary rule, and, therefore, this rule is discarded when the communication is terminated.

In the above-described example, the communication toward the IPv4 host from the IPv6 host is discussed, but a communication toward the IPv6 host from the IPv4 host and a communication which requires address translation between the IPv4 hosts (for example, communication between two IPv4 private networks in which addresses may be overlapped) also generate an address translation rule in the sequence described above to realize an communication through the address translation.

In addition, even when the communication protocols other than an IP are used, it is also possible to generate a rule for the mutual translation of a discriminator of hosts, depending on the protocol, in the same manner as that described above by providing a means to establish correspondence between the information to discriminate the host in each protocol, such as the IPv4 address and IPv6 address and the information to uniquely discriminate the host, not depending on the protocol.

As is obvious from the above description, in a communication effect through an address translation, the destination address after update by the address translation process has to be the address given actually to the host (hereinafter referred to as a "native address"). Moreover, the transmission source address before the update by the address translation process also has to be the native address.

If the destination address after an update by the address translation process is a temporary address, the following two kinds of failures may occur.

First, when a host having an address which is matched with the destination address after an update process does not exist, the packets transmitted from the address translator through address translation do not have any destination.

Second, when an address that is preset as a temporary address is overlapped with the address of a host which actually exists, the packets transmitted from the address translator through address translation reach an unexpected destination.

When an address solution provided by the DNS is utilized to start the generation of an address translation rule, a second failure may be expected to occur.

Moreover, if the transmission source address before an update obtained through an address translation process is a temporary address, another host which is given the same address as the transmission source address after the update process can be expected to exist, and, therefore, the hosts in the receiving side consider the packets as being those transmitted from another host. Accordingly, it becomes possible for malicious hosts to make a false access to a certain host or server by pretending to be one of the other actual hosts.

As described above, when the transmission source address before address translation is a temporary address or when the destination address after address translation is a temporary address in a communication which requires address translation, there is a concern that there may be an occurrence of a failure in the network which is accommodating the transmission destination host, because the packets which are given such a destination address actually exist.

SUMMARY OF THE INVENTION

An object of the present invention is to provide an address translator having, in order to prevent a network failure in a communication which requires address translation, a function to determine that a transmission source address before address translation is not a temporary address or a function to determine that a destination address after address translation is not a temporary address.

The address translator of the present invention comprises an area to store information to discriminate native addresses and temporary addresses among a plurality of corresponding addresses in association with the address translation rule in an address translation table. Therefore, this address translator creates a translation rule by assigning temporary addresses to native addresses to simultaneously store the identification information at the time of registering the translation rule to the address translation table.

Moreover, the address translator of the present invention searches the address translation table when it is requested to assign a temporary address to the address communicated from the DNS server in the name resolution process performed by the DNS in order to find the translation rule of the address communicated from the DNS server. When the target translation rule is found, the address translator judges, from the identification information, a temporary address among the corresponding two addresses conforming to the translation rule. When the address communicated from the DNS server is registered as a temporary address in the address translation table, an error response is returned to the address request by using the DNS, because the address where the destination is replaced becomes a temporary address at the time of address translation.

BRIEF DESCRIPTION OF THE DRAWINGS

FIG. 1 is a structural block diagram of an IPv4-IPv6 translator;

FIG. 13 is a diagram of an IP address translation table of an IPv4-IPv4 translator;

FIG. 17 is a sequence diagram of the processing which occurs when an IPv4 host makes access to an IPv4 host of a communication partner belonging to a network of a different address system using a false temporary address as the transmission source address.

DETAILED DESCRIPTION OF THE PREFERRED EMBODIMENTS

Embodiment 1

Figure 2A:
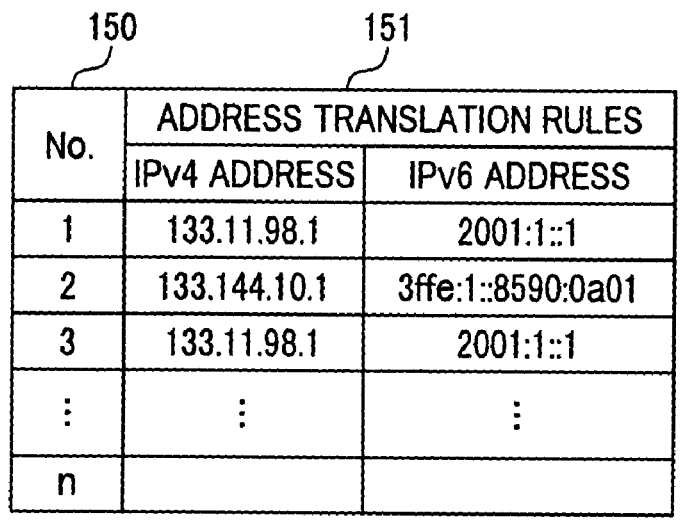
FIGS. 2A and 2B are diagrams of the IP address translation tables of the IPv4-IPv6 translators of the prior art and the present invention.

A first embodiment of the present invention will be described with reference to the accompanying drawings.

FIG. 1 is a structural block diagram of an IPv4-IPv6 translator representing a first embodiment of the present invention.

This IPv4-IPv6 translator is located between the IPv4 network and the IPv6 network to facilitate communication between an IPv4 host and an IPv6 host through IP header translation of the IPv4 packets and IPv6 packets; and, it comprises an IP packet I/O interface 12, an IP header translation module 13, a temporary IP address assignment module 14, an IP address translation information manager 15, a controller 16, and a console interface 17. Moreover, this IPv4-IPv6 translator is connected with a console unit 11 via a communication line 18.

The console unit 11 establishes operations of the IPv4-IPv6 translator and displays an operating condition thereof; and, it is comprised, for example, of a display unit, such as CRT or the like, an input unit, such as a keyboard, and an electronic device, such as CPU and RAM.

The IP packet I/O interface 12 has a function to transmit and receive IPv4 packets and IPv6 packets between the IPv4 network and the IPv6 network, and it is configured, for example, with an electronic device, such as a CPU and a RAM.

The IP header translation module 13 has a function to translate IP headers of the IPv4 packets, and it the IPv6 packets and is comprised, for example, of an electronic device, such as a CPU and a RAM.

The temporary IP address assignment module 14 has a function to assign a temporary IPv4 address or a temporary IPv6 address, as required, and it is comprised, for example, of an electronic device, such as a CPU and a RAM.

The temporary IP address assignment module 14 pools one or more IPv4 addresses, selects only one address that is not being used from the IPv4 addresses pooled for the hosts connected to the IPv6 network and then assigns this selected address as a temporary IPv4 address. Moreover, the temporary IP address assignment module 14 pools a prefix expressed with a numerical value of 96 bits, generates a numerical value of 128 bits for the hosts connected to the IPv4 network by putting the prefix of 96 bits before the IPv4 address expressed with a numerical value of 32 bits, and assigns this numerical value of 128 bits as a temporary IPv6 address.

The IP address translation information manager 15 has functions for management, reading, adding and deletion of the information for translation of the IPv4 address and IPv6 address, and it is comprised, for example, of an electronic device, such as a CPU and a RAM. The interior of this IP address translation information manager 15 is further divided into an IP address translation table 150, an IP address checking module 153 and a table searching module 154.

Figure 2B:
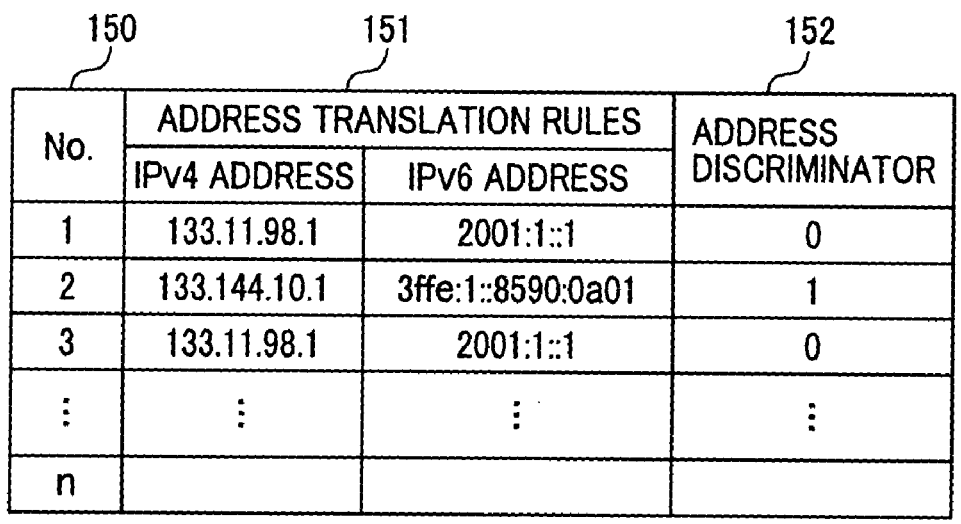

FIGS. 2A and 2B are diagrams of the IP address translation table 150. FIG. 2A shows the previously known IP address translation table, while FIG. 2B shows the IP address translation table of the present invention. In the example of FIG. 2A, of the IP address translation table 150 is provided with only an area 151 to store the IP address translation rule. Meanwhile, the structure of the present invention is characterized by the provision of an area 152 to store a discriminator of temporary addresses in addition to the area 151 to store the IP address translation rule.

The IPv4 address, with a numerical value of 32 bits, is recorded to the area used to store the IPv4 address in part of the area 151, while the IPv6 address, with a numerical value of 128 bits, is recorded to the area used to store the IPv6 address in the other part of the same area 151.

To the area 152 to store the discriminator of the temporary address, 0 is stored when the IPv4 address is a temporary address and the IPv6 address is a native address, while 1 is stored therein when the IPv6 address is a temporary address and the IPv4 address is a native address.

The controller 16 has a function to control each structural element of the IPv4-IPv6 translator, and it is comprised, for example, of an electronic device, such as a CPU and a RAM.

The console interface 17 has a function to transfer instructions inputted through the console unit 11 and transfer messages outputted from the controller 16 to the console unit 11, and it is comprised, for example, of an electronic device, such as a CPU and a RAM.

The IP address translation information manager 15, upon reception of an instruction displaying the contents of a part or the entire part of the entry of the IP address translation table 150 from the console unit 11, transmits a message describing the IPv4 address, IPv6 address, native address and temporary address of the relevant entry to the console unit 11 through the console interface 17.

Next, operation of each module of the IPv4-IPv6 translator in the temporary address assignment process and IP header translation process, which will be started when the query to the domain information of DNS is issued, will be described below sequentially.

Figure 3:
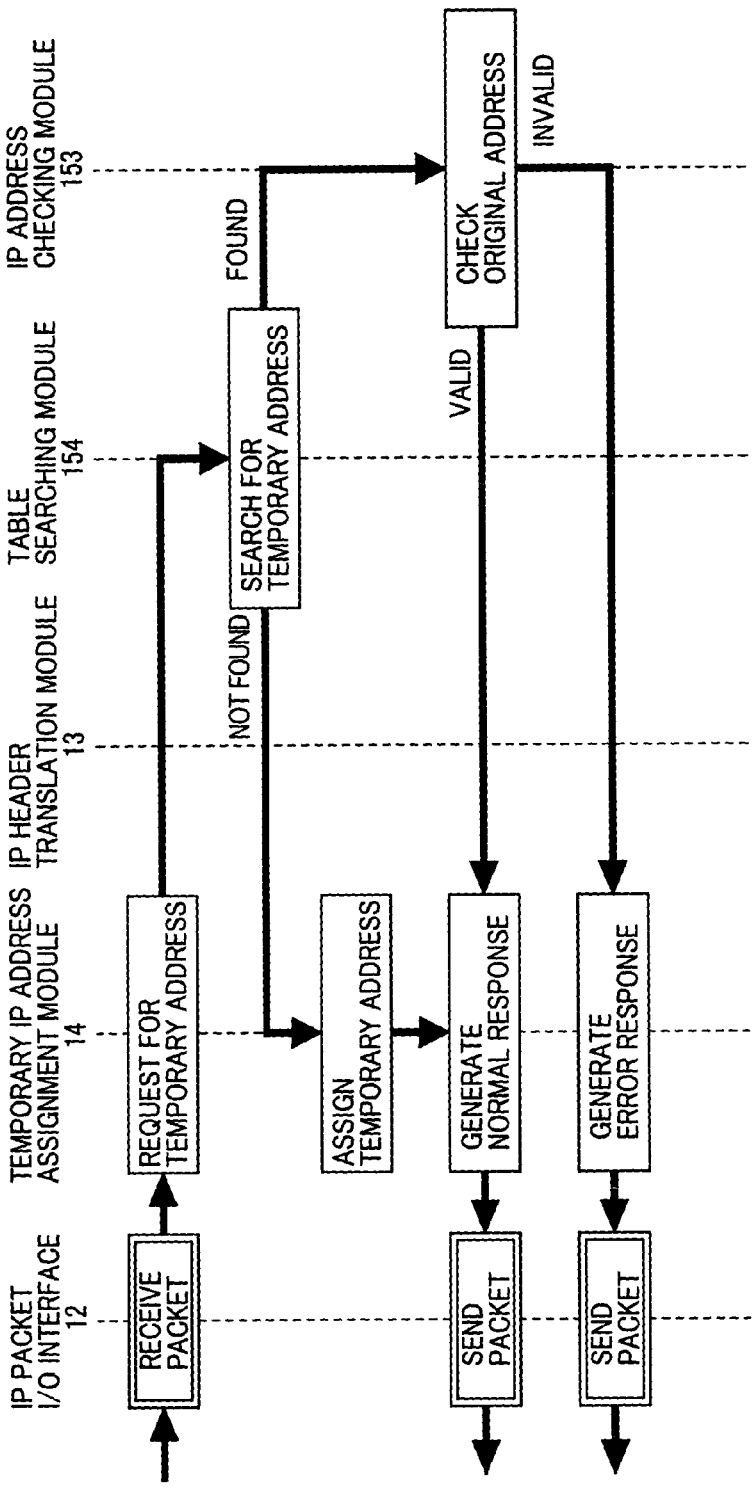
FIG. 3 is a flowchart illustrating the sequence of the process to assign temporary addresses when a query of the DNS is issued.

FIG. 3 is a flowchart showing the procedures of the temporary address assignment process when a query of the DNS is issued.

The IPv4-IPv6 translator 1 is connected with a DNS proxy server via a communication line.

The DNS proxy server receives a query of domain information from hosts within the IPv4 network and IPv6 network in accordance with the DNS technology described in the RFC104 and RFC1886 or the like, transfers the query to the DNS server within the IPv4 network or IPv6 network and then returns the domain information obtained to the query source hosts.

The DNS proxy server obtains, when there are different kinds of addresses in the query received from the host and in the answer received from the DNS server, a temporary address, from the IPv4-IPv6 translator belonging to the same kind as the query from the host and then returns an address answer of the DNS response from the DNS server to the query source host by generating the DNS response updated to the temporary address obtained. However, if acquisition of a temporary address fails, an erroneous DNS response is returned to the query source host.

The IPv4-IPv6 translator 1 receives a message via the IP packet I/O interface 12 when the message to request a temporary address arrives from the DNS proxy server and then transfers this message to the temporary IP assignment module 14.

In order to check whether a temporary address is already assigned for a source address communicated from the DNS server by the DNS proxy server (hereinafter, referred to as "original address"), the temporary IP address assignment module 14 issues a query for a temporary address corresponding to the original address to the IP address translation information manager 15. The original address is described in the message for requesting the temporary address.

In the IP address translation information manager 15, the IP address checking module 153 searches the IP address translation table 150 to find the original address. As a result, if the target entry cannot be found, a message suggesting no existence of an entry is communicated to the temporary IP address assignment module 14.

The temporary IP address assignment module 14, upon reception of a message suggesting no-existence of an entry, determines that the temporary address is not yet assigned, newly assigns a temporary address and registers it to the IP address translation table 150. In this case, the discriminator of the temporary address is also registered to the table. Thereafter, the temporary IP address assignment module 14 generates a response message including the newly assigned temporary address and then returns this message to the DNS proxy server through the IP packet I/O interface 12.

Meanwhile, when the entry including the original address is found as a result of a table search, the IP address searching module 154 transfers contents of the relevant entry to the IP address checking module 153.

This IP address checking module 153 checks to determine whether an attribute of the original address is a native address or a temporary address by referring to the discriminator of the temporary address in the entry received. When it is verified that the original address is registered as the native address as a result of the address check, the IP address checking module 153 judges the normal condition where the temporary address is already assigned and transfers the temporary address described in the relevant entry to the temporary IP address assignment module 14.

The temporary IP address assignment module 14, upon reception of the temporary address from the IP address checking module 153, transfers a response message including the notified temporary address and returns this message to the DNS proxy server through the IP packet I/O interface 12.

When it has been determined as a result of an address check that the original address has been registered as a temporary address, the IP address checking module 153 informs the temporary IP address assignment module 14, that a failure has occurred in the original address.

The temporary IP address assignment module 14, upon reception of a failure in the original address from the IP address checking module 153, transfers a response message indicating that assignment of a temporary address has failed and it returns this response message to the DNS proxy server through the IP packet I/O interface 12. Moreover, the temporary IP address assignment module 14 transmits the message indicating that assignment of temporary address has been requested to the temporary address to the console unit 11 through the console interface 17.

The present invention also has a function to prevent transmission of a packet which is given the transmission source address or destination address to the network accommodating the destination host when the transmission source address before address translation is a temporary address or when the destination address after address translation is a temporary address. Moreover, the present invention further has a function to communicate the occurrence of this situation, if it has occurred, to an administrator in order to urge him to take a proper measure.

In other words, the address translator of this embodiment searches the address translation table at the time of executing the address translation process in order to find the translation rule of the destination address recorded in the packets received and the translation rule of the transmission source address of the same packets. When the target translation rule is found, the address translator judges which address among two addresses in the corresponding condition in the translation rule is a temporary address from the aforementioned discriminator. In the case where the transmission source address provided in the received packets before the translation process is registered as a temporary address or when the address to update the destination address provided in the packets received is registered as a temporary address, the address translator discards the packets received.

Moreover, the address translator of this embodiment sends a message indicating the occurrence of a failure to the administrator using the communicating means described above in the cases, where the means for communicating the occurrence of a failure to the administrator is provided and the address sent from the DNS server is registered to the address translation table as a temporary address, and where the transmission source address of the received packets before the address translation process, or the address to update the destination of the received packets when the address translation process is executed, is registered as a temporary address to the address translation table.

Figure 4:
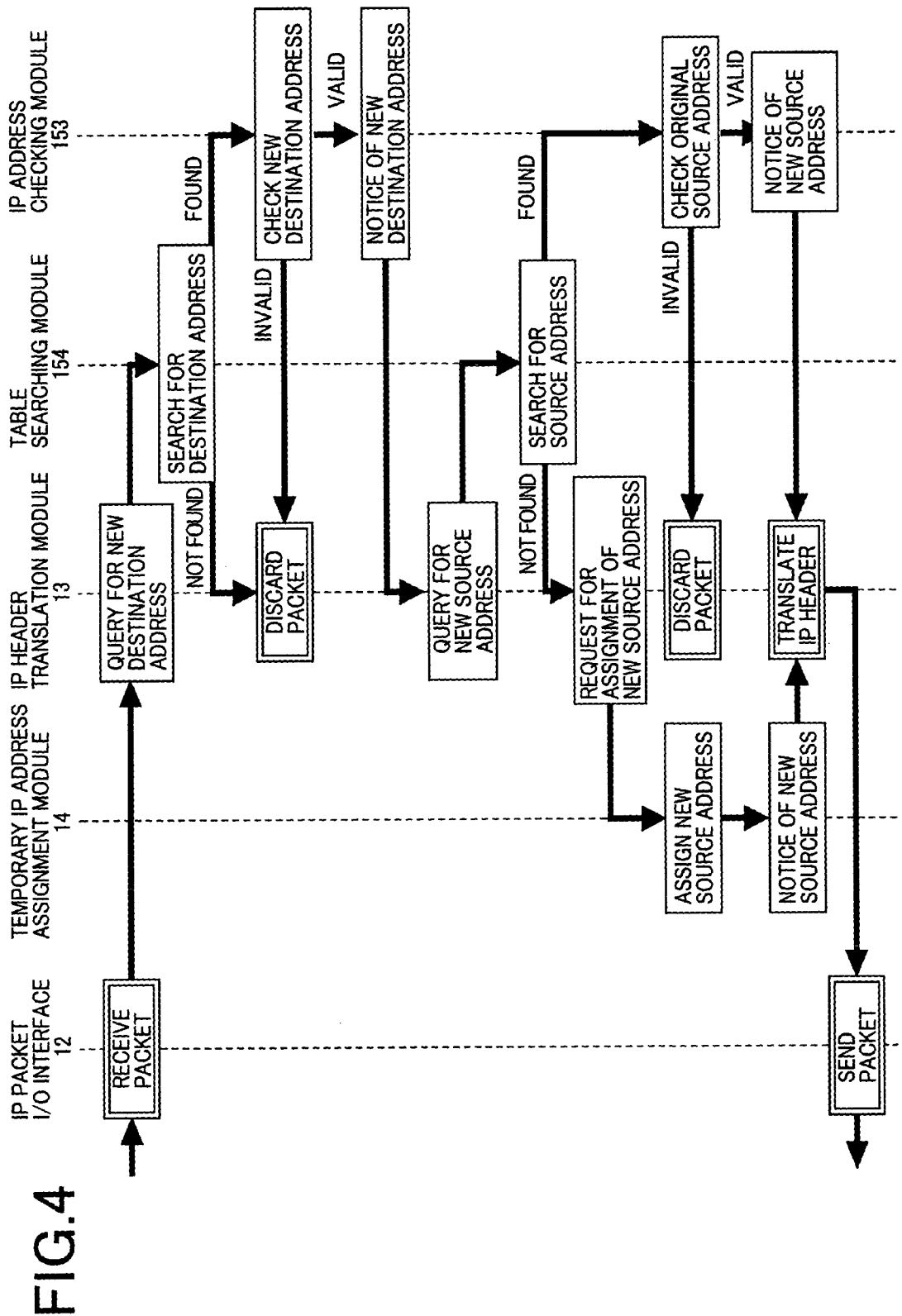
FIG. 4 is a flowchart illustrating the sequence of the IP header translation process.

FIG. 4 is a flowchart showing the procedures of the IP header translation process.

The IPv4-IPv6 translator 1, when packets arrive from any one of the networks connected, carries out the receiving process with the IP packet I/O interface 12 and transfers the relevant message to the IP header translation module 13.

The IP header translation module 13 issues a query to replace the destination address of the received packets to the IP address translation information manager 15.

In the IP address translation information manager 15, the table searching module 154 searches the IP address translation table 150 to find an entry including the destination address of the received packets. If the entry including the destination address cannot be found as a result of this search, a communication is sent to the IP header translation module 13 indicating that the entry does not exist.

Since the destination address is changed to the native address from the temporary address, if the address for replacement does not exist, translation is no longer performed. Therefore, the IP header translation module 13 discards the received packets by judging that the address translation is now impossible when it is notified that the entry including the destination address does not exist.

On the other hand, when the entry including the destination address can be found as a result of a table search, the table searching module 154 transfers the contents of the relevant entry to the IP address checking module 153.

The IP address checking module 153 checks to determine whether the attribute of the address to replace the destination address is a native address or a temporary address by referring to the discriminator of the temporary address in the entry received. When it is found as a result of checking that the address to be used to replace the destination address is registered as the temporary address, the IP address checking module 153 indicates to the temporary IP address assignment module 14, that the relevant address is a temporary address.

The IP header translation module 13, when it is notified from the IP address checking module 153 that the address to be used to replace the destination address is a temporary address, judges that the host which is given the relevant address does not exist in the destination side network and discards the received packets. Moreover, a message indicating that the packet, in which the temporary address becomes the destination through address translation, has been received, is transmitted to the console unit 11 through the console interface 17.

When it is proved as a result of address checking that the address to be used to replace the destination address is registered as the native address, the IP address checking module 153 judges this condition as the normal condition 20 and transfers the relevant address to the IP header translation module 13.

The IP header translation module 13, when it receives an address to be used to replace the destination address from the IP address checking module 153, transmits a query to replace the transmission source address of the received packets to the IP address translation information manager 15.

In the IP address translation information manager 15, the table searching module 154 searches the IP address translation table 150 to find an entry including the transmission source address of the received packets. When the entry including the transmission source address cannot be found as a result of the search, it is indicated, to the IP header translation module 13 that the entry including the transmission source address does not exist.

The transmission source address is changed to a temporary address from a native address. Therefore, when it is indicated that the entry including the transmission source address does not exist, the IP header translation module 13 judges that the temporary address is not yet assigned, and it requests assignment of the temporary address to the IP address assignment module 14.

Upon reception of the request from the IP header translation module 13, the IP address assignment module 14 assigns a new temporary address to the transmission source address of the received packets and then registers this new temporary address to the IP address translation table 150. In this case, the discriminator of the temporary address is also registered to the IP address translation table 150.

On the other hand, when the entry including the transmission source address is found as a result of the search, the table searching module 154 transfers the contents of the entry to the IP address checking module 153.

The IP address checking module 153 checks to determine whether the transmission source address is a native address or a temporary address by referring to the discriminator of the temporary address included in the entry received. When it is found as a result that the transmission source address is registered as a temporary address, the IP address checking module 153 indicates that the relevant address is a temporary address to the IP address assignment module 14.

When it is indicated, from the IP address checking module 153 that the transmission source address is a temporary address, the IP header translation module 13 judges that the host which is given the relevant address does not exist in the transmitting side network and discards the received packets. Moreover, this IP header translation module 13 transmits a message indicating that the packet having a temporary address as a transmission source has been received by the console unit 11 through the console interface 17.

When it is found as a result of an address check that the transmission source address is registered as the native address, the IP address checking module 154 judges that it is in the normal state and transfers the address to replace the transmission source address to the IP header translation module 13.

Upon reception of the address to replace the transmission source address from the IP address checking module 153, the IP header translation module 13 generates a new IP header having the address communicated from the address checking module 153 as the destination using such address as the transmission source, uses the newly generated IP header in place of the IP header of the received packets, and then transmits the new IP packet to the destination side network through the IP packet I/O interface 12.

Operations and the transition of internal conditions of the IPv4-IPv6 translator 1 when a practical network has been applied will be described sequentially.

Figure 5:
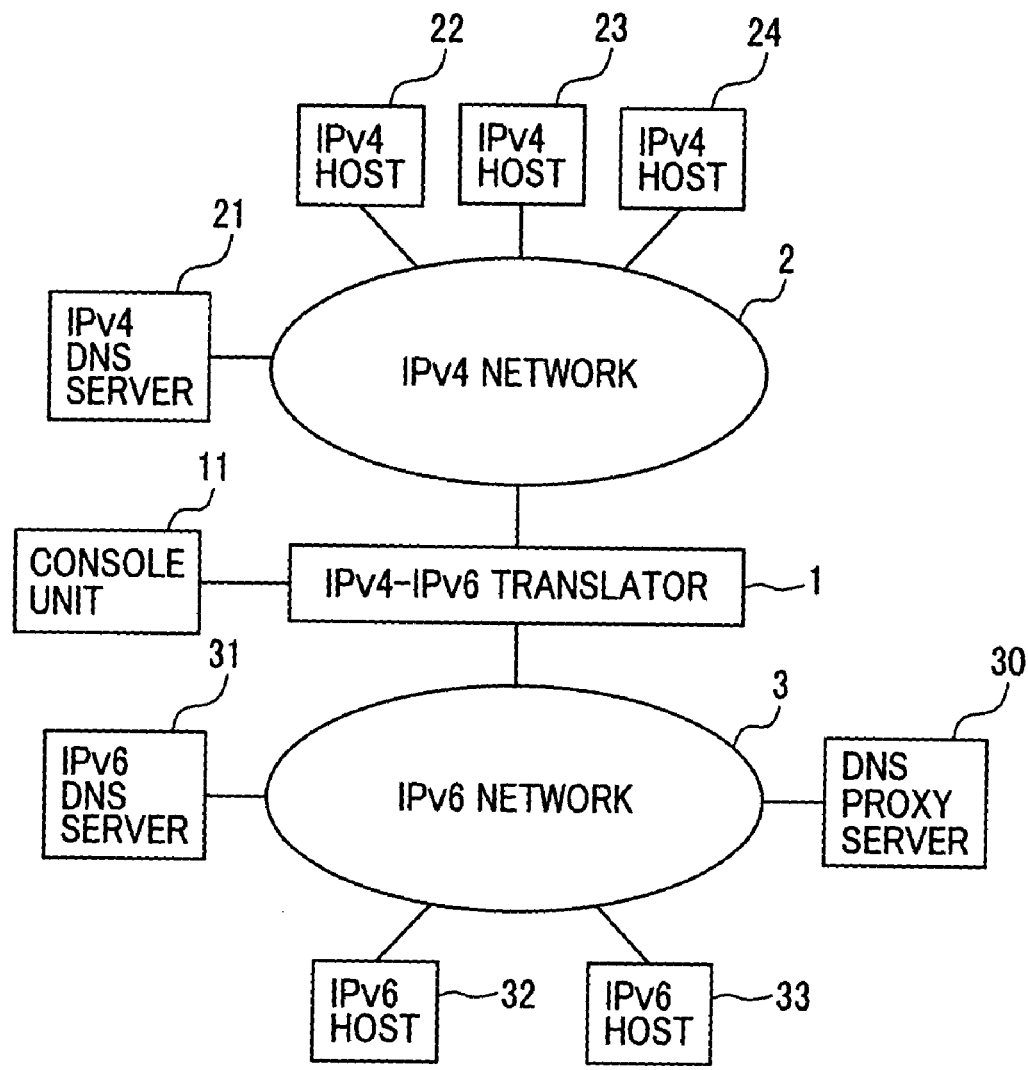
FIG. 5 is a schematic block diagram of a communication network connecting an IPv4 network and an IPv6 network via an IPv4-IPv6 translator.

FIG. 5 is a schematic block diagram of a communication network system wherein the IPv4 network 2 and the IPv6 network 3 are connected through the IPv4-IPv6 translator 1. The IPv4-IPv6 translator 1 is connected with the console unit 11, and the contents of the table illustrated in FIG. 2B are displayed as required in the display screen of the console unit.

The IPv4 network 2 is connected with an IPv4 DNS server 21 and an IPv4 host 22. These devices use only the IPv4 as a communication protocol. Here, it is assumed that the IPv4 host 22 is given the IPv4 address 133.144.10.1.

The IPv6 network 3 is connected with a DNS proxy server 30, an IPv6 DNS server 31 and an IPv6 host 32. These devices use only the IPv6 as the communication protocol. It is also assumed that the IPv6 host 32 is given the IPv6 address 2001:1::1. The IPv4 DNS server 21 performs management of the domain information of the IPv4 network 2. This domain information assures. registered correspondence between the host names and the IPv4 addresses, but it does not assure registered correspondence between the host names and the IPv6 addresses.

The IPv6 DNS server 31 performs management of the domain information of the IPv6 network 3. This domain information assures registered correspondence between the host names and the IPv6 addresses, but it does not assure registered correspondence between the host names and the IPv6 addresses.

The DNS proxy server 30 is set to transfer a query for the domain information of the IPv4 network 2 to the IPv4 DNS server 21 and to transfer a query for the domain information of the IPv6 network 3 to the IPv6 DNS server 31.

The IPv4-IPv6 translator 1 is here assumed to reserve 254 IPv4 addresses up to 133.11.98.254 from 133.11.98.1 as the temporary IPv4 addresses to be assigned to the IPv6 hosts. Moreover, as a prefix to generate the temporary IPv6 address assigned to the IPv4 host, 3ffe:1::/96 is reserved.

In addition, in the IPv4-IPv6 translator 1, the necessary address translation rule is preset to realize communication between the IPv4 DNS server 21 and the IPv4 host 22 or DNS proxy server 30 through address translation.

First, as an example of the reception of normal packets by the IPv4-IPv6 translator 1, communication between the IPv4 host 22 and the IPv6 host 32 will be considered.

Figure 6:
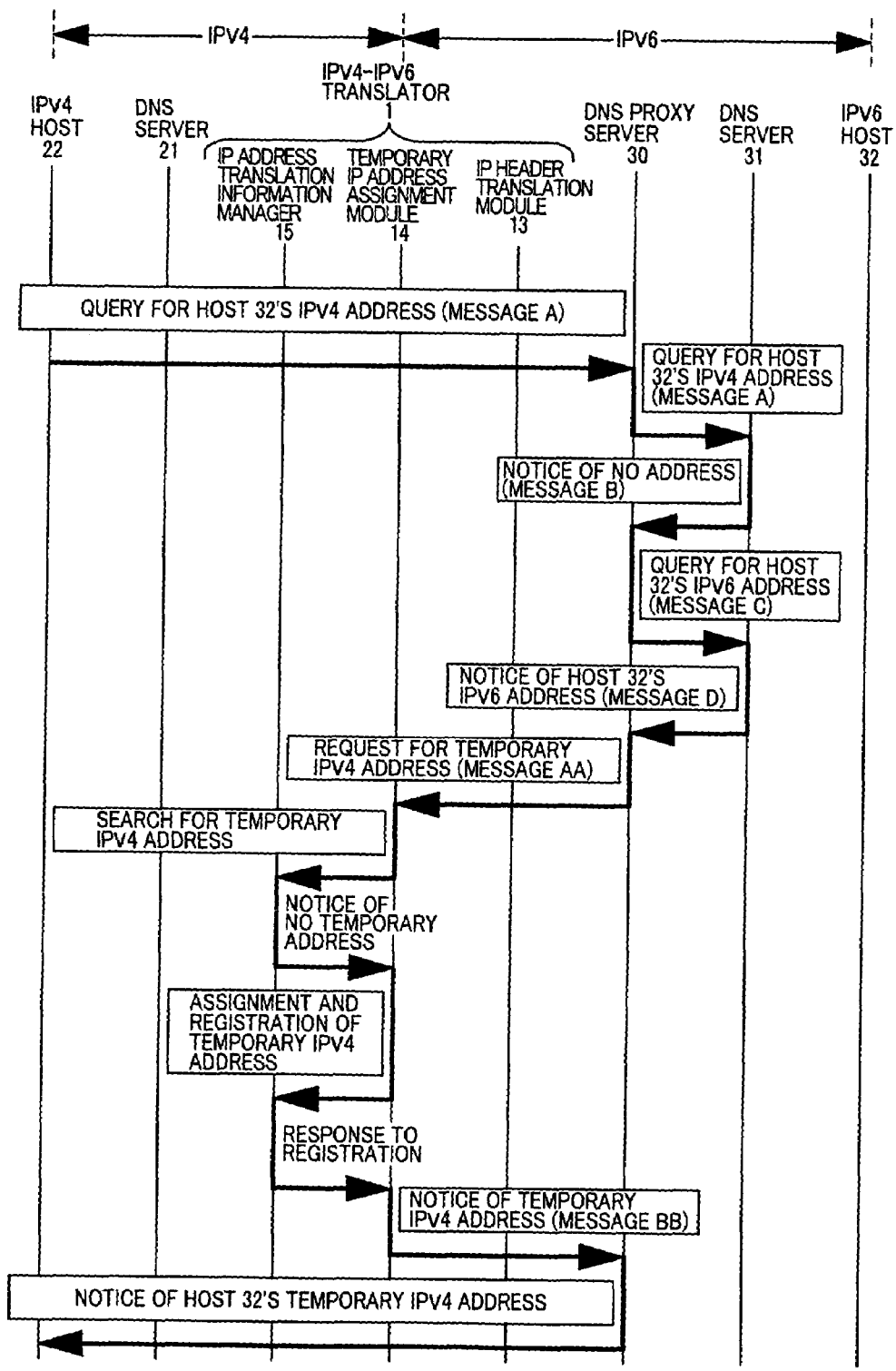
FIG. 6 is a sequence diagram for effecting name solution of an IPv6 host by an IPv4 host.

FIG. 6 is a sequence diagram showing the procedures used for name resolution of the IPv6 host 32 by the IPv4 host 22.

The IPv4 host 22 transmits a message inquiring as to the IPv4 address corresponding to the name of the IPv6 host (hereinafter referred to as the "message A") to the DNS proxy server 30.

The message A is translated, by the IPv4-IPv6 translator 1 to the IPv6 packet from the IPv4 packet, and it is then transferred to the DNS proxy server 30. The DNS proxy server 30 transfers the message A to the IPv6 DNS server 31.

The IPv6 DNS server 31, upon reception of the message A, searches the IPv4 address corresponding to the name of IPv6 host 32. Since the IPv4 address is not yet registered, however, a response message suggesting that such IPv4 address is not yet registered (hereinafter referred to as the "message B") is returned to the DNS proxy server 30.

The DNS proxy server 30 generates a duplicated message A because it cannot obtain the IPv4 address corresponding to the name of IPv6 host 32 as a result of reception of the message B, and it then generates a message inquiring as to the IPv6 address corresponding to the name of IPv6 host 32

(hereinafter referred to as the "message C") and transfers this message to the IPv6 DNS server 31.

The IPv6 DNS server 31, upon reception of the message C, searches for the IPv6 address for the name of IPv6 host 32 and returns the registered IPv6 address 2001:1::1 as a response message for the message B (hereinafter referred to as the "message D") to the DNS proxy server 30.

The DNS proxy server 30, upon reception of the message D, transmits a message requesting a temporary IPv4 address for the address 2001:1::1 (hereinafter referred to as the "message AA") because the IPv6 address 2001:1::1 is described within the message D and this address is never the IPv4 address being requested in the message A received from the IPv4 host 22.

When the message AA is received, the IPv4-IPv6 translator 1 searches the IP address translation table 150 to check whether the temporary IPv4 address for the IPv6 address 2001:1::1 is already registered or not. However, the target address translation information is not yet registered, at this time, to the IP address translation table 150.

Therefore, the IPv4-IPv6 translator 1 assigns the IPv4 address 133.11.98.1 as a temporary IPv4 address for the IPv6 address 2001:1::1, records the address 133.11.98.1 to the area storing the IPv4 address in the entry 1 of the IP address translation table 150, records the address 2001:1::1 to the area storing the IPv6 address, and records to value 0 to the area storing the discriminator of the temporary address, thereby indicating that the IPv4 address is the temporary address and the IPv6 address is the native address.

Moreover, the IPv4-IPv6 translator 1 returns the temporary IPv4 address 133.11.98.1 to the DNS proxy server 30 as a response to the message AA (hereinafter referred to as the "message BB").

The DNS proxy server 30 updates the IPv6 address 2001:1::1, described in the message D, to the temporary IPv4 address 133.11.98.1 and returns a response message for the message A (hereinafter referred to as the "message E") to the IPv4 host 22. This message E is translated, in the course of transfer, to the IPv4 packet from the IPv6 package by the IPv4-IPv6 translator 1 and is then sent to the IPv4 host 22.

When the message E is received, the IPv4 host 22 transmits an IPv4 packet of the destination address 133.11.98.1 and the transmission source address 133.144.10.1 (hereinafter referred to as the "packet a") to the IPv4-IPv6 translator 1.

Figure 7:
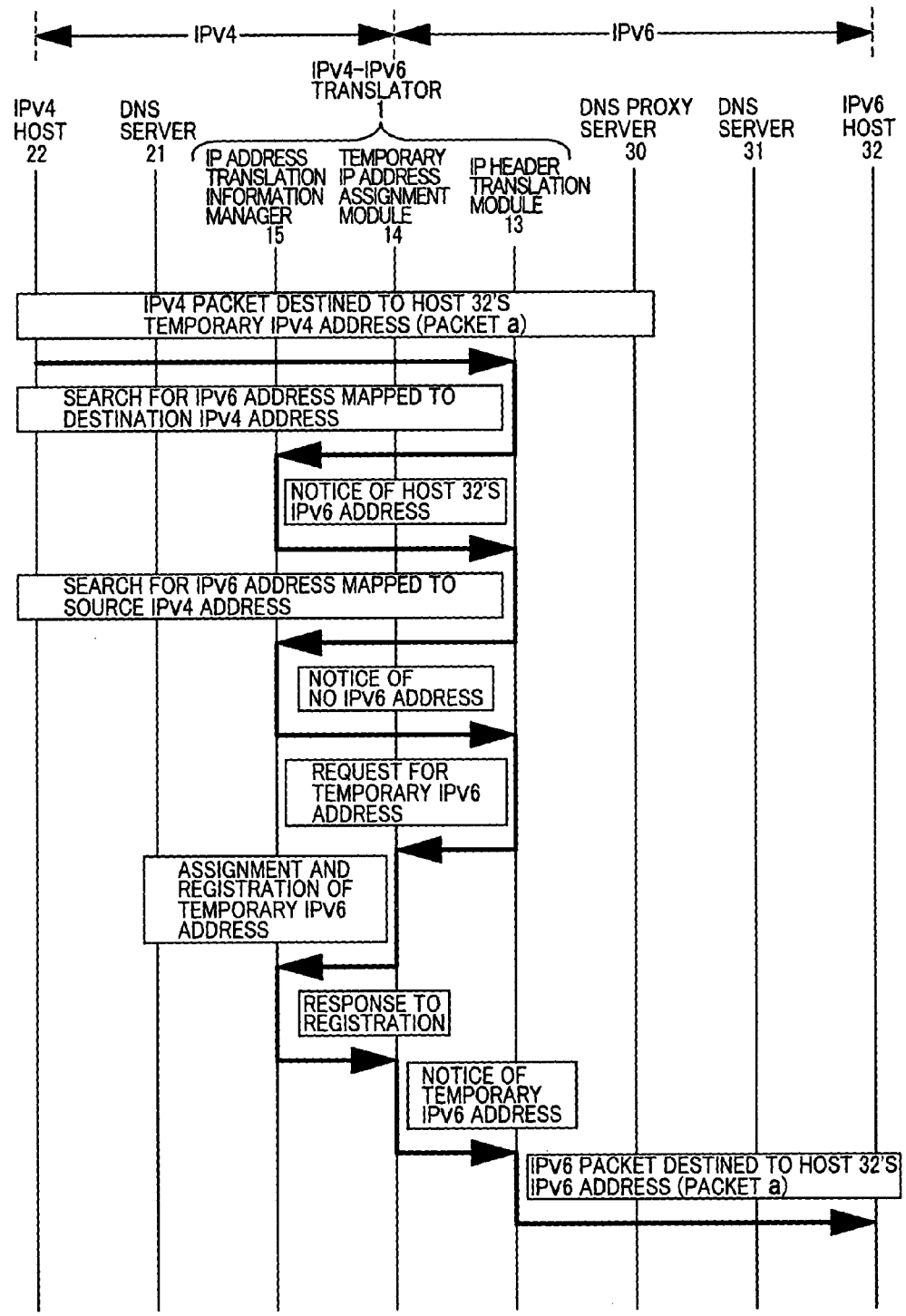
FIG. 7 is a sequence diagram of the processing which occurs when an IPv4 host transmits a first packet to an IPv6 host after the name solution of the IPv6 host by the IPv4 host.

FIG. 7 is a sequence diagram showing the flows until the packet a reaches the IPv6 host 32 after it has been transmitted from the IPv4 host.

The IPv4-IPv6 translator 1, upon reception of the packet a, searches the IP address translation table 150 to find the IPv6 address corresponding to the IPv4 address 133.11.98.1. Here, it is found that the IPv6 address 2001:1::1 corresponding to the IPv4 address 133.11.98.1 is described in the entry 1 that has been registered previously.

Next, as a result of reference to the discriminator of the temporary address of entry 1, because the value 0 is recorded, it is determined that the IPv4 address is a temporary address and the IPv6 address is a native address. Namely, the address to replace the destination address is the native address under the normal condition. Therefore, the IPv6 address 2001:1::1 recorded in the entry 1 becomes the destination address after the IP header translation process.

Next, the IPv4-IPv6 translator 1 searches the IP address translation table 150 to find the IPv6 address corresponding to the IPv4 address 133.144.10.1. However, at this time, the target address translation information is not registered in the IP address translation table 150.

Therefore, the IPv4-IPv6 translator 1 adds the prefix 3ffe:1::/96 to the IPv4 address 133.144.10.1 to newly generate the temporary IPv6 address 3ffe:1::8590:0a01, records the address 133.144.10.1 to the area for storing the IPv4 address in the entry 2 of the IP address translation table 150, and then records 3ff3:1::8590:0a01 to the area for storing the IPv6 address, and records the numeral 1 indicating that the IPv6 address is a temporary address and the IPv4 address is the native address to the area for storing kinds of the temporary addresses. The IPv6 address 3ffe:1::8590:0a01 generated at this time becomes the transmission source address after the IP header translation process.

Since the addresses required for translation of packet a are all obtained, the IP header translation process is performed. Thereby, the packet a is translated to the IPv6 packet having the destination address 2001:1::1 and transmission source address 3ffe:1::8590:0a01. This IPv6 packet is transmitted to the IPv6 network 3 and reaches the IPv6 host 32.

Figure 8:
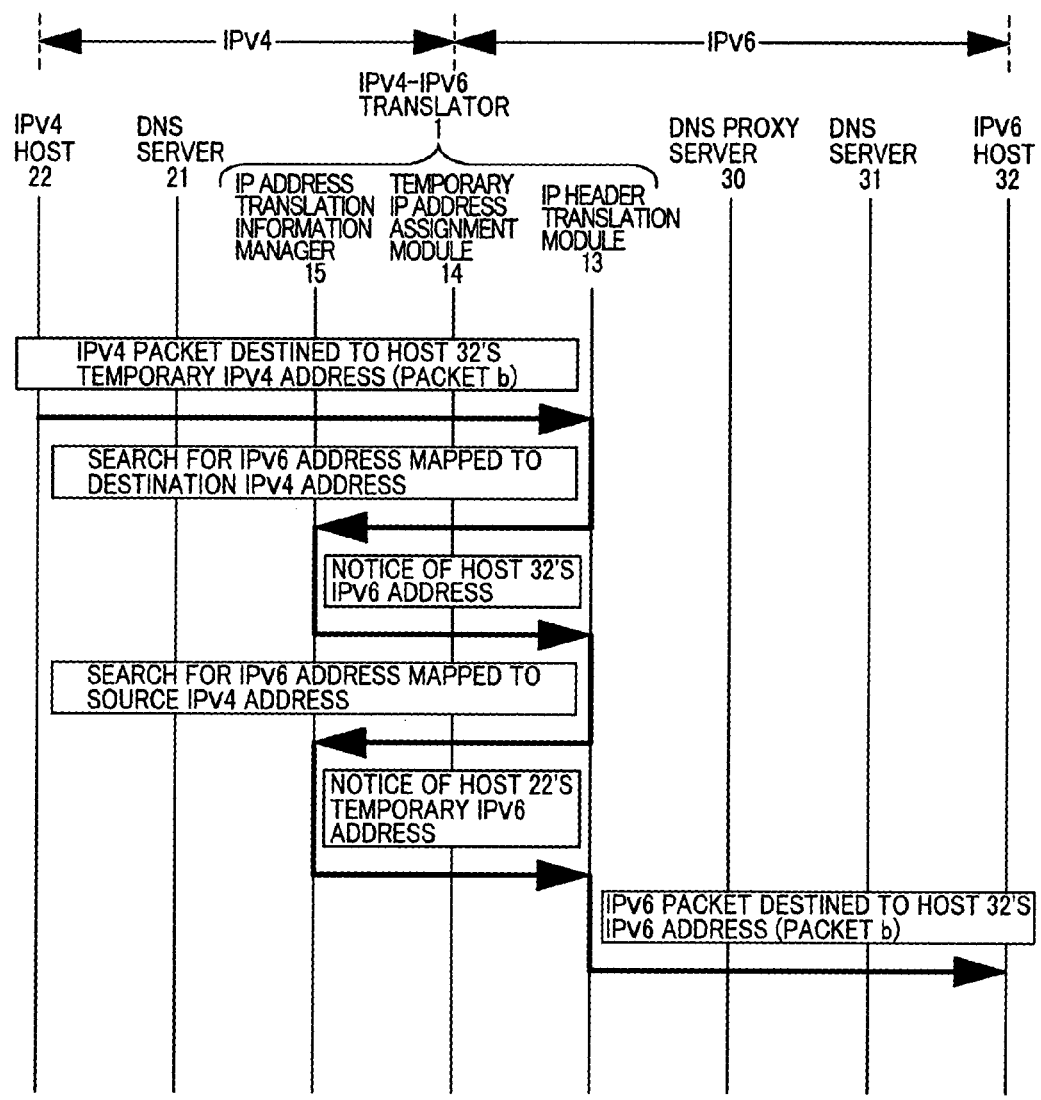
FIG. 8 is a sequence diagram of the processing which occurs when an IPv4 host transmits a second and successive packets to an IPv6 host after the name resolution of the IPv6 host by the IPv4 host.

FIG. 8 is a sequence diagram showing the flows until the IPv4 host 22 has transmitted an IPv4 packet of the destination address 133.11.98.1 and transmission source address 133.144.10.1 (hereinafter referred to as the "packet b") after transmission of the packet a and this IPv4 packet reaches the IPv6 host 32.

According to FIG. 8, the IPv4-IPv6 translator 1, upon reception of the packet b, repeats the procedure described above up to the search of the IPv6 address corresponding to the IPv4 address 133.144.10.1 of the transmission source.

As a result of the search of the IPv6 address of the transmission source, it is found at this time that the IPv6 address 3ffe:1::8590:0a01 corresponding to the IPv4 address 133.144.10.1 is stored in the previously registered entry 2 of the address translation table 150.

Next, as a result of reference to the discriminator of the temporary address of entry 2, because the value 1 is recorded, it is determined that the IPv6 address is a temporary address and the IPv4 address is a native address. Namely, the transmission source address before address translation is the native address under the normal condition. Therefore, the IPv6 address 3ffe:1::9590:0a0a recorded to the entry 2 becomes the transmission source address after the IP header translation process.

Since the addresses required for translation of the packet b are all obtained as described above, the IP header translation process is performed and the packet b is translated to the IPv6 packet of the destination address 2001:1::1 and transmission source address of 3ffe:1::8590:0a01 and this IPv6 packet is transmitted to the IPv6 network 3 and then reaches the IPv6 host 32.

Figure 9:
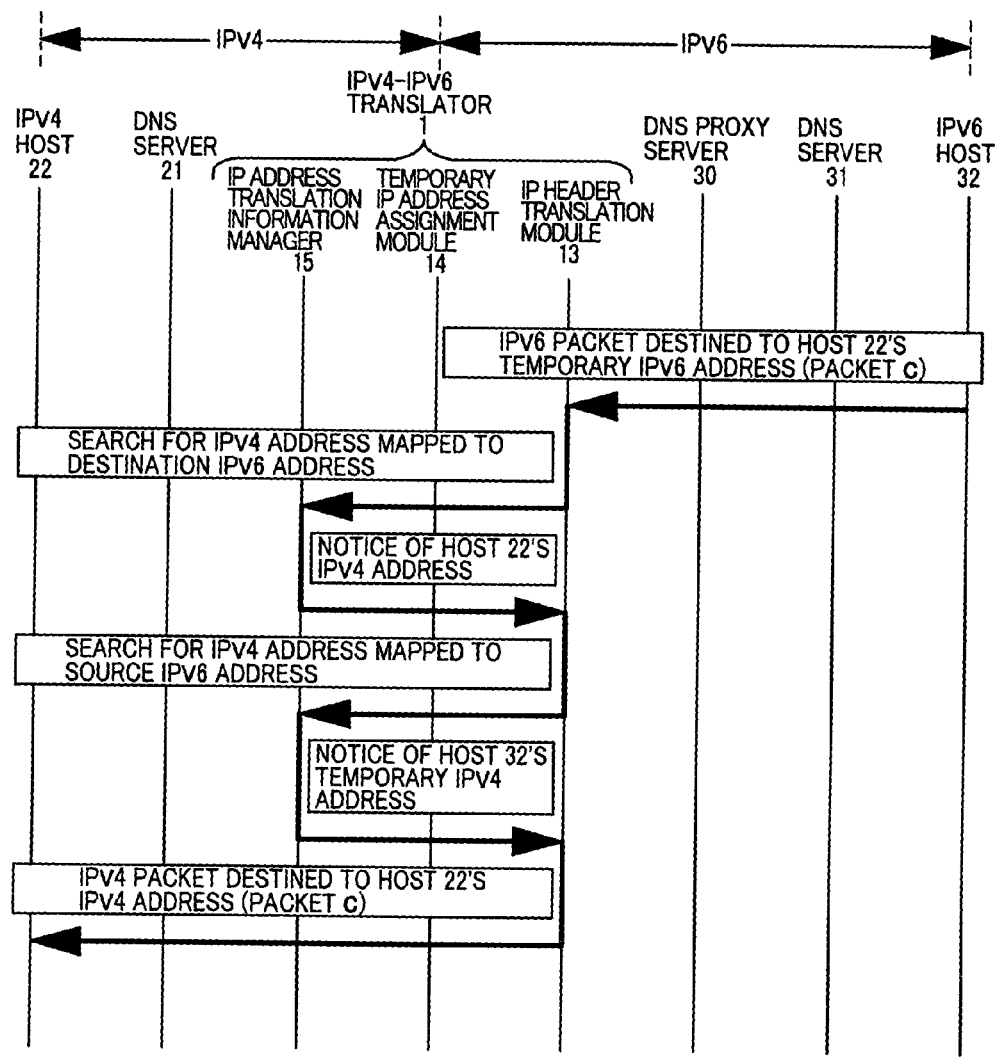
FIG. 9 is a sequence diagram of the processing which occurs when an IPv6 host transmits packets to an IPv4 host after the name resolution of the IPv6 host by the IPv4 host.

FIG. 9 is a sequence diagram showing the flows until the IPv6 host 32 transmits a packet of the destination address of 3ffe:1::8590:0a01 and transmission source address of 2001:1::1 (hereinafter referred to as the "packet c") and this packet c reaches the IPv4 host 22.

The IPv4-IPv6 translator 1, upon reception of the packet c, searches the IP address translation table 150 to find the IPv4 address corresponding to the destination address 3ffe:1::8590:0a01. As a result, it is found that the IPv4 address 133.144.10.1 corresponding to the IPv6 address 3ffe:1::8590:0a01 is stored in the entry 2 registered previously.

Next, as a result of reference to the discriminator of the temporary address of entry 2, because the value 1 is recorded, it is determined that the IPv6 address is a temporary address and the IPv4 address is a native address. Namely, the address to replace the destination address is the native address under the normal condition. Therefore, the IPv4 address 133.144.10.1 recorded in the entry 2 is used as the destination address after the IP header translation process.

Moreover, the IPv4-IPv6 translator 1 searches the IP address translation table 150 to find the IPv4 address corresponding to the IPv6 address 2001:1::1 of the transmission source. As a result, it can be found that the IPv4 address 133.11.98.1 corresponding to the IPv6 address 2001:1::1 is stored in the entry 1 registered previously.

Next, as a result of reference to the discriminator of the temporary address of the entry 1, because the value 0 is recorded, it is determined that the IPv4 address is a temporary address and the IPv6 address is an native address. Namely, the transmission destination address before address translation is the native address in the normal condition. Therefore, the IPv4 address 133.11.98.1 recorded to the entry 1 becomes the destination address after the IP header translation process.

Since the addresses required for translation of packet c are all obtained as described above, the IP header translation process is performed. Thereby, the packet c is translated to the IPv4 packet of the destination address 133.144.10.1 and the transmission source address 133.11.98.1. This IPv4 packet is then transmitted to the IPv6 network 2 and reaches the IPv6 host 22.

Next, a first example in which the IPv4-IPv6 translator 1 receives defective packets will be considered. The communication is moreover extended to the IPv4 host 23, from the IPv6 network when the IPv4 host 23 which is given the IPv4 address 133.11.98.1, is connected to the IPv4 network 2 under the condition that the communication is performed to the IPv6 host 32 from the IPv4 host 22.

Figure 10:
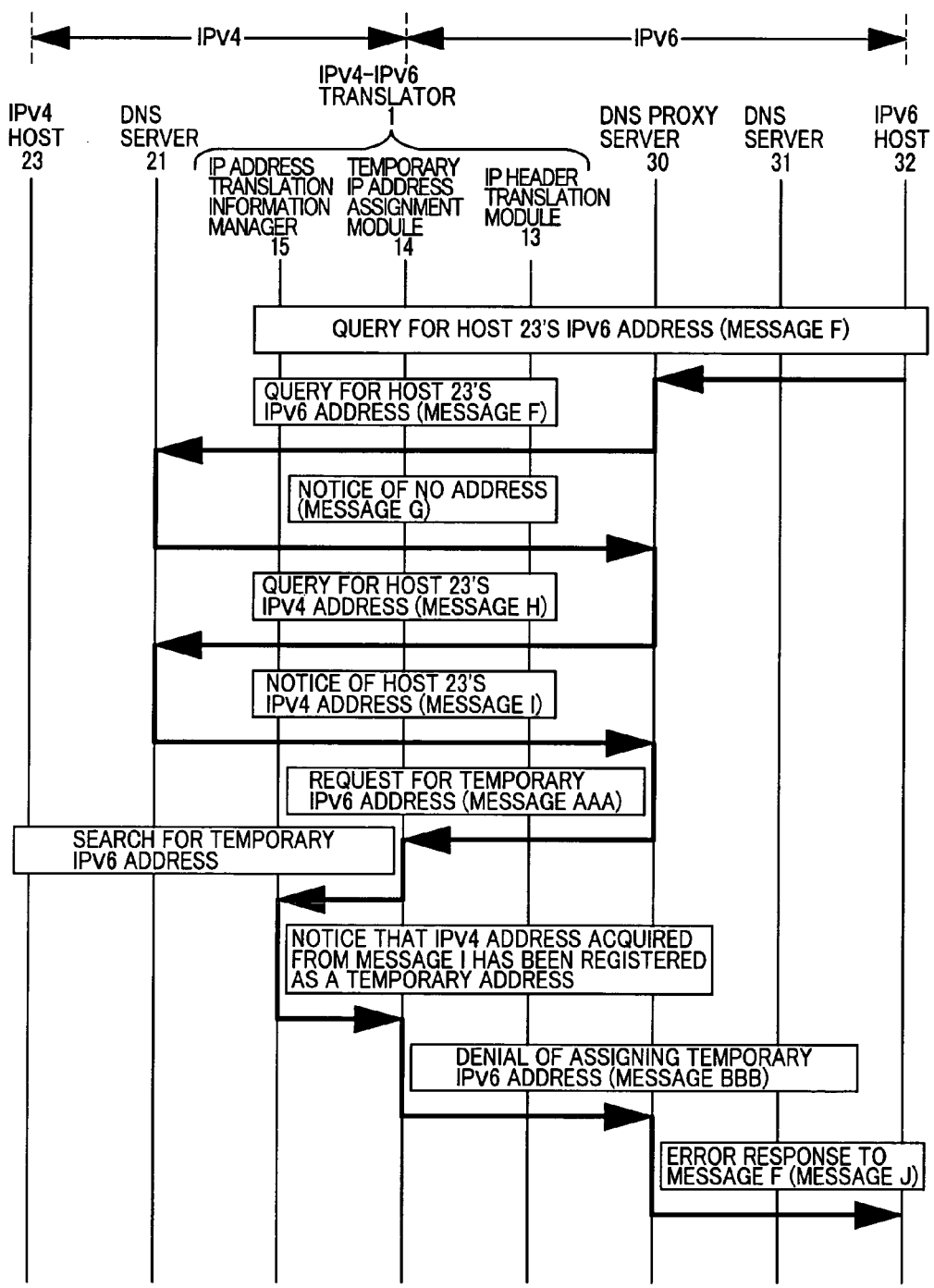
FIG. 10 is a sequence diagram of the processing which occurs when a source address is overlapped with a temporary address at the time of assigning a temporary address of an IPv4 host when an IPv6 host issues a query of the DNS.

FIG. 10 is a sequence diagram showing the procedures when the IPv6 host 32 makes communication to the IPv4 host 23.

The IPv6 host 32 transmits, to the DNS proxy server 30, a message inquiring as to the IPv6 address corresponding to the name of the IPv4 host 23 (hereinafter referred to as the "message F"). The DNS proxy server 30 transfers the message F to the IPv4 DNS server 21. This message F is translated, in the course of transfer, to the IPv4 packet from the IPv6 packet by the IPv4-IPv6 translator 1 and is then transferred to the IPv4 DNS server 21.

When the message F is received, the IPv4 DNS server 21 searches for the IPv6 address corresponding to the name of IPv4 host 23; however, since the IPv6 address is not registered, it returns a response message suggesting no registration of the IPv6 address (hereinafter referred to as the "message G") to the DNS proxy server 30. The message G is translated to the IPv6 packet from the IPv4 packet in the IPv4-IPv6 translator 1 and is then transferred to the DNS proxy server 30.

The DNS proxy server 30 duplicates the message F, because the IPv6 address corresponding to the name of the IPv4 host 23 cannot be obtained as a result of reception of the message G and thereafter generates a message inquiring as to the IPv4 address corresponding to the name of the IPv4 host 23 (hereinafter referred to as the "message H") and transfers this message H to the IPv4 DNS server 21. The message H is translated, in the course of transfer, to the IPv4 packet from the IPv6 packet in the IPv-IPv6 translator 1 and is then transferred to the IPv4 DNS server 21.

Upon reception of the message H, the IPv4 DNS server 21 searches for to the IPv4 address for the name of the IPv4 host and returns the IPv4 address 133.11.98.1 registered to the DNS proxy server 30 as a response message for the message H (hereinafter referred to as the "message I"). The message I is translated, in the course of transfer, to the IPv6 packet from the IPv4 packet in the IPv4-IPv6 translator 1 and is then transferred to the DNS proxy server 30.

When the message I is received, because the IPv4 address 133.11.98.1 is described in the message I and this address is not the IPv6 address which is provided in the message F received from the IPv6 host 32, the DNS proxy server 30 transmits a message requesting the temporary IPv6 address corresponding to the address 133.11.98.1 to the IPv4-IPv6 translator 1 (hereinafter referred to as the "message AAA").

Upon reception of the message AAA, the IPv4-IPv6 translator 1 searches the IP address translation table 150 to find the IPv6 address corresponding to the IPv4 address 133.11.98.1. Here, the IPv6 address 2001:1::1 corresponding to the IPv4 address is found to be stored in the entry 1 registered previously.

Next, as a result of reference to the discriminator of the temporary address of entry 1, since the value 0 is registered, it is determined that the IPv4 address is a temporary address and the IPv6 address is a native address. Namely, the original IPv4 address is registered as a temporary address. Therefore, the IPv4-IPv6 translator 1 returns a message suggesting that assignment of the IPv6 address has failed to the DNS proxy server 30 as a response to the message AAA (hereinafter referred to as the "message BBB").

Moreover, the IPv4-IPv6 translator 1 transmits to the console unit 11 a message suggesting that assignment of the temporary IPv6 address has been requested for the temporary IPv4 address.

Since the response to the temporary IPv6 address request has been an error response as a result of reception of the message BBB, the DNS proxy server 30 transmits an error response to the message F (hereinafter referred to as the "message J") to the IPv6 host 32.

Here, the IPv6 host 32 stops the communication toward the IPv4 host 23 because the response to the address request has been an error response as a result of reception of the message J.

Next, a second example of reception of defective packets by the IPv4-IPv6 translator 1, will be considered in which a malicious user makes access to the IPv6 host 33 connected to the IPv6 network from the IPv4 host connected to the IPv4 network under the condition that the communication is extended to the IPv6 host 32 from the IPv4 host 22. Here, it is assumed that the IPv6 host 33 is given the IPv6 address 2001:1::2.

Figure 11:
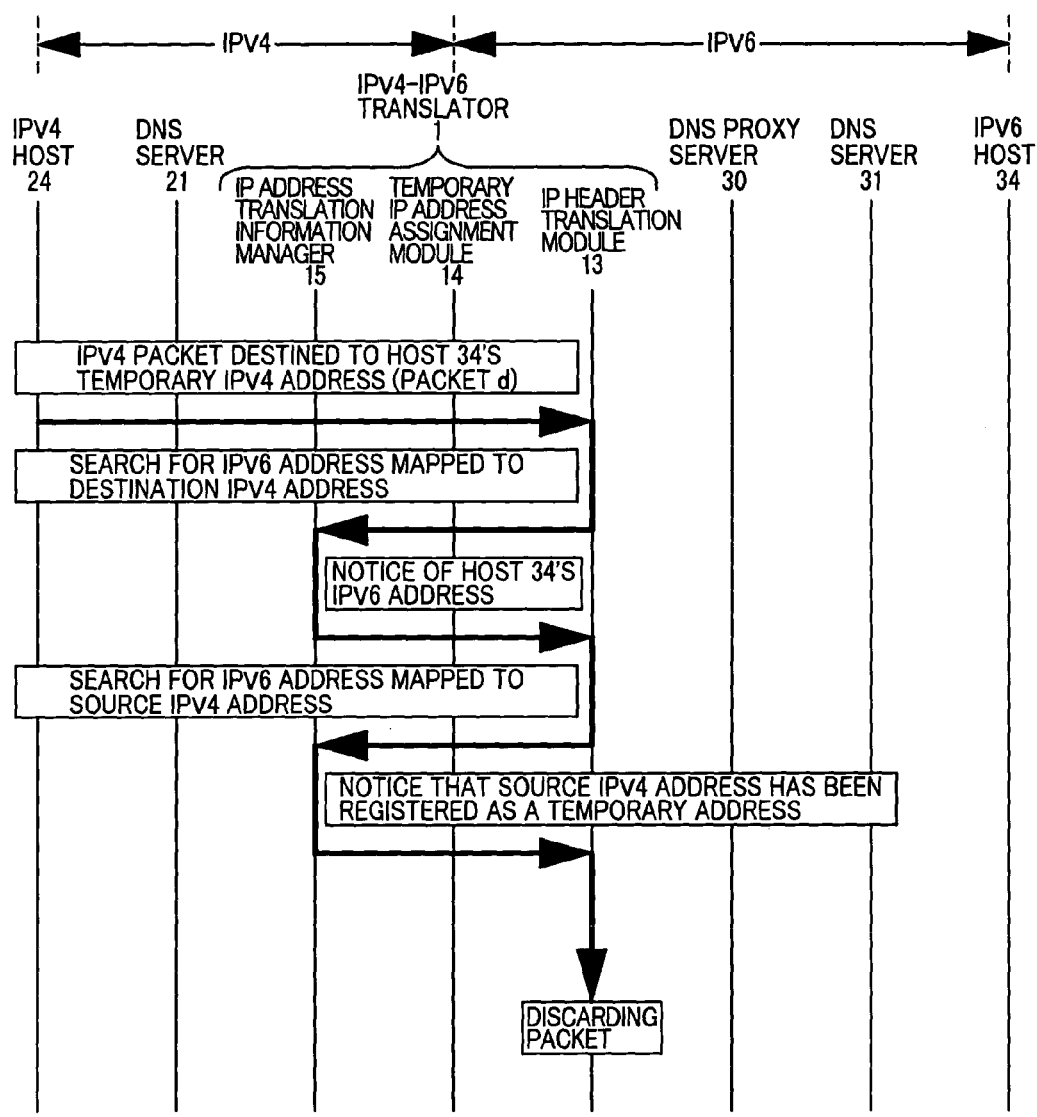
FIG. 11 is a sequence diagram of the processing which occurs when an IPv4 host makes access to an IPv6 host using a false temporary address as the transmission source address.

FIG. 11 is a sequence diagram showing the procedures which are carried out when the IPv4 host 24 makes communication to the IPv6 host using a false transmission source address 133.11.98.1. However, it is assumed that the exclusive temporary IPv4 address 133.11.98.2 for the IPv6 address 2001:1::2 is registered in the IPv4-IPv6 translator 1 to the entry 3 of the IP address translation table 150 through the name solution of the DNS, as in the case of FIG. 6.

The IPv4 host 24 obtains the IPv4 address 133.11.98.2 of the destination as in the case of FIG. 6 and transmits an IPv4 packet of a false destination address 133.11.98.2 and a transmission source address 133.11.98.1 (hereinafter, referred to as the "packet d") to the IPv4-IPv6 translator 1.

When the packet d is received, the IPv4-IPv6 translator 1 searches the IP address translation table 150 to find the IPv6 address corresponding to the IPv4 address 133.11.98.2. On the basis of the result of search, the IPv6 address 2001:1::2 is set as the destination address after the IP header translation process.

Next, the IPv4-IPv6 translator 1 searches the IP address translation table 150 to find the IPv6 address corresponding to the IPv4 address 133.11.98.1. Here, it is found that the IPv6 address 2001:1::1 corresponding to the IPv4 address 133.11.98.1 is stored in the entry 1 registered previously.

Next, as a result of reference to the discriminator of the temporary address of entry 1, because the value 0 is recorded, it is determined that the IPv4 address is a temporary address and the IPv6 address is a native address. Namely, the transmission source of packet d is registered as the temporary address, which is opposed to the condition that the transmission source of receiving packet has to be the native address. Therefore, the IPv4-IPv6 translator 1 discards the packet d.

Moreover, the IPv4-IPv6 translator 1 transmits to the console unit 11 a message suggesting that the packet having the temporary IPv4 address as the transmission source address has been received.

Hereinafter, if the IPv4 host 24 tries to make communication with a host of the IPv6 network 3 using a false transmission source address 133.11.98.1, the communication with a host of the IPv6 network 3 cannot be realized because the packet is discarded in the IPv4-IPv6 translator 1 as described above.

Embodiment 2

The embodiment described above relates to a mutual translation between an IPv4 address and an IPv6 address, but the present invention does not depend on either kinds or numbers of addresses. Therefore, the present invention can also be adapted to a translator for translating an IPv4 address to another IPv4 address, a translator for translating addresses other than an IP address and a translator for mutual translation among three or more kinds of addresses.

In the case of FIG. 5, the DNS proxy server 30 is allocated in the IPv6 network, but it may also be allocated in any type of network when communication is possible for all networks connected to the address translator. Moreover, it is also possible to realize co-location of the DNS proxy server and the address translator.

In order to discriminate a temporary address and a native address among a plurality of addresses described in the individual address translation rule, a value indicating the kinds of temporary addresses (IPv6 address or IPv4 address) is stored for each entry, but it is also possible, in place of this method, that the attribute of an address (native address or temporary address) is stored for each address.

The console unit 11 is independent of the IP network in FIG. 1, but it is sometimes connected to an address translator via the IPv4 network or IPv6 network. In this case, the message to the console unit, when a fault occurs, is transmitted through an IP packet I/O interface in place of an independent console interface.

As a means to notify an administrator as to the occurrence of a fault, a display or an alarm lamp or an alarm sound generator may be provided to the address translator body as a subsidiary or substitute of the console unit 11.

On the occasion of the address translation process, any one of the searches for the destination address translation rule and transmission source address translation rule may be started earlier. Moreover, it may be selected freely such that, upon completion of the search of the translation rule and the address check of any one of destination address and transmission source address, the search of a translation rule and an address check of the other address is performed or a check of both addresses is performed after the search of the translation rule of both addresses is completed.

As the profile of the second embodiment of the present invention, an IPv4-IPv4 translator 1b will be described.

Figure 12:
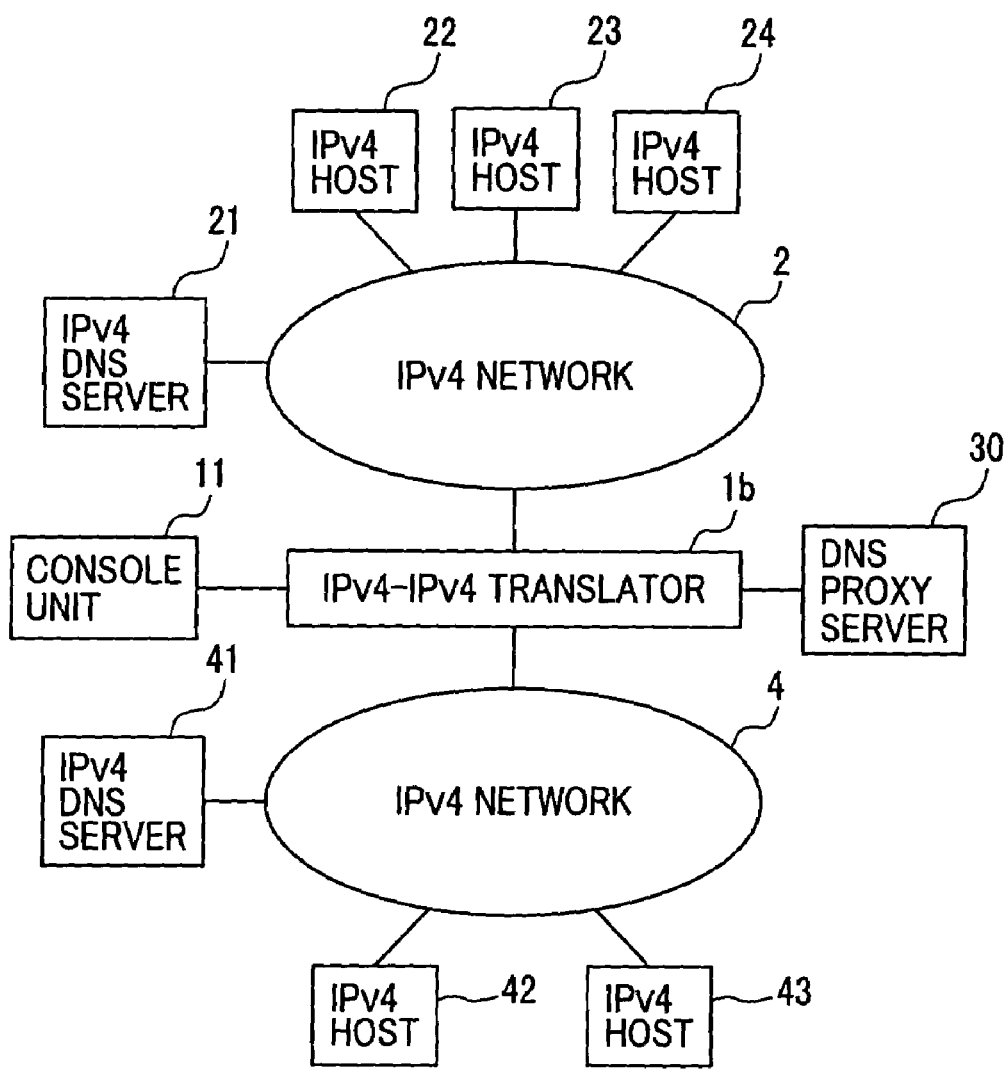
FIG. 12 is a schematic block diagram of a communication network connecting two IPv4 networks of different address systems via an IPv4-IPv4 translator.

FIG. 12 is a schematic diagram of a communication network system in which the IPv4 network 2 and an IPv4 network 4 are connected through the IPv4-IPv4 translator 1b. In the IPv4-IPv4 translator 1b, the console unit 11 and the DNS proxy server 30 are connected.

In the IPv4 network 2, the IPv4 DNS server 21 and the IPv4 host 22 are connected. It is assumed here that the IPv4 host 22 is given the exclusive IPv4 address 133.144.10.1 of the IPv4 network 2.

In the IPv4 network 4, an IPv4 DNS server 41 and an IPV4 host 42 are connected. It is assumed also that the IPv4 host 42 is given the exclusive IPv4 address 192.168.1.1 of the IPv4 network 4.

The IPv4 DNS server 21 performs management of the domain information of the IPv4 network 2. In this domain information, correspondence between the name of a host and the exclusive IPv4 address of the IPv4 network 2 is registered.

Meanwhile, the IPv4 DNS server 41 performs management of the domain information of the IPv4 network 4. In this domain information, correspondence between the name of a host and the exclusive IPv4 address of the IPv4 network 4 is registered.

The DNS proxy server 30 is set to transfer an inquiry for the domain information of the IPv4 network 2 to the IPv4 DNS server 21 and to transfer an inquiry for the domain information of the IPv4 network 4 to the IPv4 DNS server 41. Moreover, the DNS proxy server 30 makes communication with the IPv4-IPv4 translator 1b with the IPv6 packet.

Here, it is assumed that 254 IPv4 addresses up to 133.11.98.254 from 133.11.98.1 are reserved for the IPv4-IPv4 translator 1b as the exclusive temporary IPv4 addresses of the IPv4 network 2 for assignment to the hosts connected to the IPv4 network 4. Moreover, it is also assumed that 254 IPv4 addresses up to 192.168.100.254 from 192.168.100.1 are also reserved as the exclusive temporary IPv4 addresses of the IPv4 network for assignment to the hosts connected to the IPv4 network 2.

It is further assumed that the necessary address translation rule is preset to the IPv4-IPv4 translator 1b to realize communication between the IPv4 DNS server 21, IPv4 host 22, IPv4 DNS server 41 and the DNS proxy server 30 through the address translation.

FIG. 13 is a structural diagram of an IP address translation table 150b. One entry of this table includes an area 153 for storing the exclusive IPv4 address of the IPv4 network 2, an area 154 for storing attribute information of the IPv4 address, an area 155 for storing the exclusive IPv4 address of the IPv4 network, an area 156 for storing attribute of the IPv4 address, an area 157 for storing the temporary IPv6 address for intermediation between the exclusive IPv4 address of the IPv4 network 2 and the exclusive IPv4 address of the IPv4 network 4, and an area 158 for storing an attribute of the IPv6 address. When the addresses described in the areas 153, 155, and 157 are native addresses, the numeral 1 is recorded to the areas 154, 156, and 158, while the numeral 0 is recorded when these addresses are temporary addresses.

The IPv4-IPv4 translator 1b generates the temporary IPv6 address to which is appended the prefix 3ffe:1::/96 for the exclusive IPv4 address of the IPv4 network 2, while the temporary IPv6 address to which is appended the prefix 2001:1::/96 for the exclusive IPv4 address of the IPv4 network 4. Accordingly, even if the IPv4 address overlapping in both the IPv4 network 2 and the IPv4 network 4 exists, these addresses can be discriminated.

Operations and the transition of an internal condition of the IPv4-IPv4 translator 1b, when it has been applied to practical networks, will be described sequentially.

Communication to the IPv4 host 42 from the IPv4 host 22 will be considered first as an example of normal reception of packets by the IPv4-IPv4 translator 1b.

Figure 14:
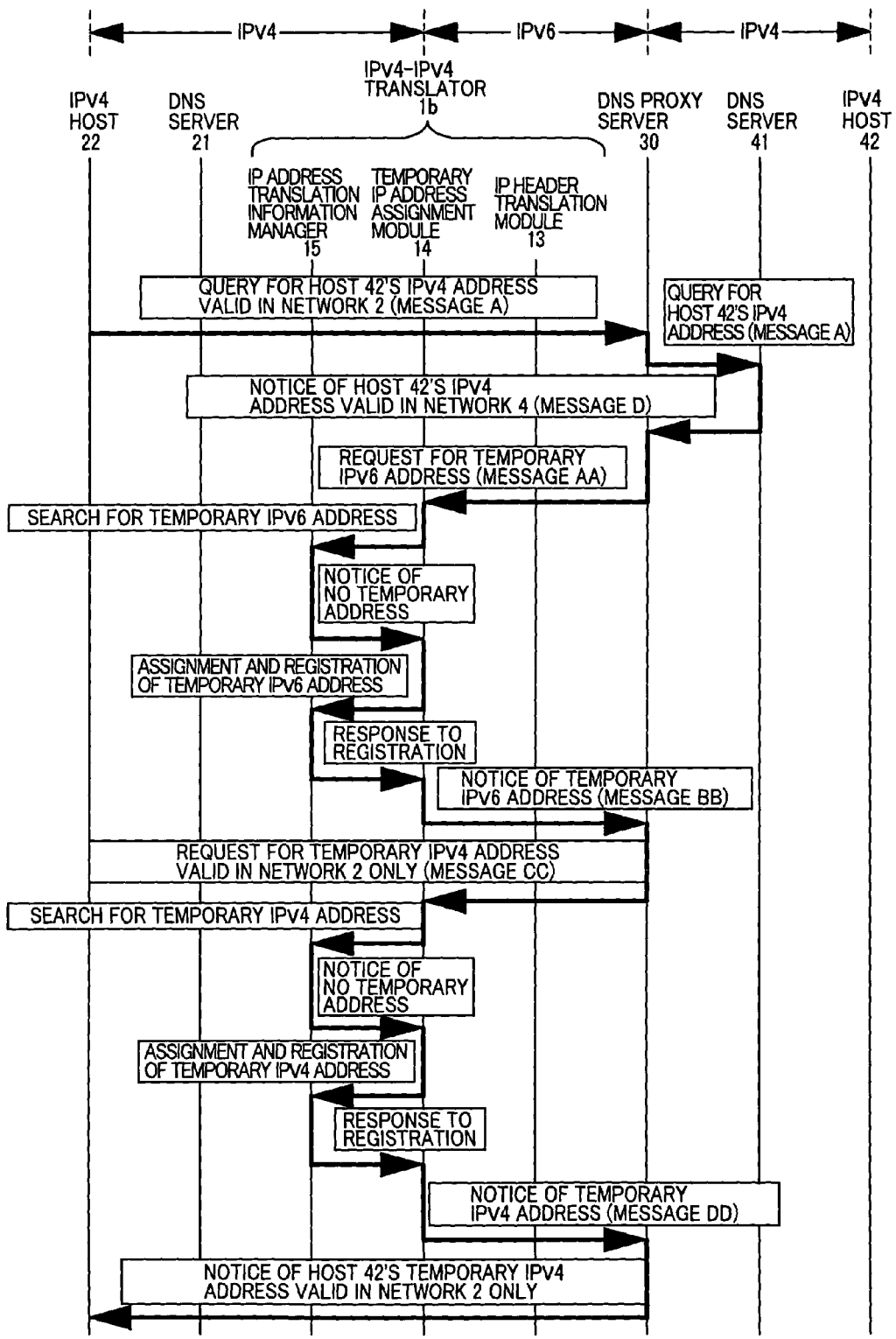
FIG. 14 is a sequence diagram of the processing which occurs when an IPv4 host performs the name solution of an IPv4 host of a communication partner belonging to a network of a different address system.

FIG. 14 is a sequence diagram showing the procedures for name resolution of the IPv4 host 42 by the IPv4 host 22.

The IPv4 host 22 transmits to the DNS proxy server 30 a message inquiring as to the IPv4 address corresponding to the name of IPv4 host 42 (hereinafter referred to as the "message A"). The DNS proxy server 30 transfers the message A to the IPv4 DNS server 41.

The IPv4 DNS server 41 returns, to the DNS proxy server 30, the IPv4 address 192.168.1.1 corresponding to the name of IPv4 host 42 as a response message for the message A (hereinafter referred to as the "message D")

When the message D is received, the DNS proxy server 30 judges that the IPv4 address 192.168.1.1 in the message D is the exclusive address of the IPv4 network and therefore it cannot be received by the IPv4 network 2 and transmits first a message requesting the temporary IPv6 address to the address 192.168.1.1 (hereinafter referred to as the message "AA") to the IPv4-IPv4 translator 1b.

The IPv4-IPv4 translator 1b, upon reception of the message AA, searches the IP address translation table 150b. Accordingly, it is proved that the temporary IPv4 address for the exclusive IPv4 address 192.168.1.1 of the IPv4 network is not yet assigned.

Therefore, the IPv4-IPv4 translator 1b assigns the IPv6 address 2001:1::c0a8:0101 as a temporary IPv6 address to the IPv4 address 192:168:1.1, records the address 192.168.1.1 to the area for storing the exclusive IPv4 address of the IPv4 network 4 in the entry 1 of the IP address translation table 150b, records the value 1 indicating that the relevant address is the native address to the area for storing attribute of the IPv4 address, records the address 2001:1::c0a8:0101 to the area for storing the IPv6 address, and records the value 0 indicating that the relevant address is a temporary address to the area for storing an attribute of the IPv6 address.

Moreover, the IPv4-IPv4 translator 1b returns the temporary IPv6 address 2001:1::c0a8:0101 to the DNS proxy server 30 as a response to the message AA (hereinafter referred to as the "message BB").

Upon reception of the message BB, the DNS proxy server 30 transmits a message requesting the exclusive temporary IPv4 address of the IPv4 network 2 for the IPv6 address 2001:1::c0a8:0101 (hereinafter referred to as the "message CC") to the IPv4-IPv4 translator 1b.

When the message CC is received, the IPv4-IPv4 translator 1 searches the IP address translation table 150b and thereby it is proved that the exclusive temporary IPv4 address of the IPv4 network 2 for the IPv6 address 2001:1::c0a8:0101 is not yet assigned.

Therefore, the IPv4-IPv4 translator 1 assigns the address 133.11.98.1 for the IPv6 address 2001:1::c0a8:0101 as the exclusive temporary IPv4 address of the IPv4 network 2, records the address 133.11.98.1 to the area for storing the exclusive IPv4 address of the IPv4 network 2 in the entry 1 of the IP address translation table 150b, and records the value 0 indicating that the relevant address is a temporary address to the area for storing an attribute of the IPv4 address.

In addition, the IPv4-IPv4 translator 1b returns the exclusive temporary IPv4 address 133.11.98.1 of the IPv4 network 2 to the DNS proxy server 30 as a response to the message CC (hereinafter referred to as the "message DD").

The DNS proxy server 30 updates the exclusive IPv4 address 192.168.1.1 of the IPv4 network 4 described in the message D to the exclusive temporary IPv4 address 133.11.98.1 of the IPv4 network 2 and returns a response message to the message A (hereinafter referred to as the "message E") to the IPv4 host 22.

Upon reception of the message E, the IPv4 host 22 transmits the IPv4 packet of the destination address 133.11.98.1 and transmission source address 133.144.10.1 (hereinafter referred to as the "packet a") to the IPv4-IPv6 translator 1b.

Figure 15:
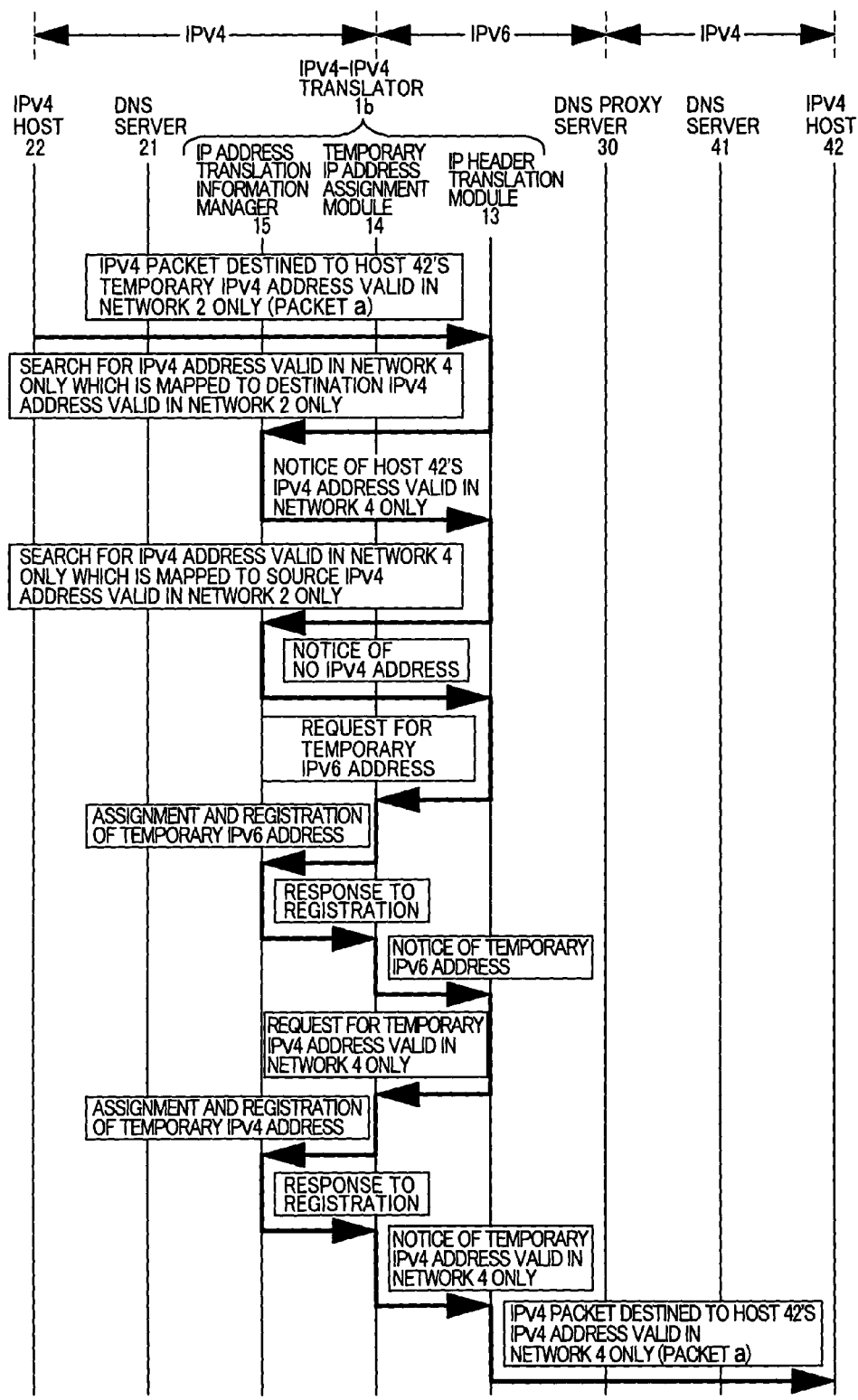
FIG. 15 is a sequence diagram of the processing which occurs when an IPv4 host transmits a first packet to an IPv4 host of a communication partner after the IPv4 host has completed the name resolution of the IPv4 host of the communication network belonging to a network of a different address system.

FIG. 15 is a sequence diagram showing the flows until the packet a reaches the IPv4 host 42 after it is transmitted from the IPv4 host 22.

When the packet a is received, the IPv4-IPv4 translator 1b searches the IP address translation table 150b and obtains, from the entry 1, the exclusive IPv4 address 192.168.1.1 of the IPv4 network 4 corresponding to the exclusive IPv4 address 133.11.98.1 of the IPv4 network 2.

Next, as a result of reference to the attribute information of the exclusive IPv4 address of the IPv4 network 4 of the entry 1, it is proved that the value 1 indicating the native address is recorded under the normal condition.

Next, the IPv4-IPv4 translator 1b searches the IP address translation table 150b to find the exclusive IPv4 address of the IPv4 network 4 corresponding to the exclusive IPv4 address 133.144.10.1 of the IPv4 network 2. As a result, it is proved that the target address translation information is not yet registered.

Therefore, the IPv4-IPv4 translator 1b assigns the temporary IPv6 address 3ffe:1::8590:0a01 for the IPv4 address 133.144.10.1, records the address 133.144.10.1 to the area for storing the exclusive IPv4 address of the IPv4 network 2 in the entry 2 of the IP address translation table 150b, records the value 1 indicating that the relevant address is the native address to the area for storing an attribute of the IPv4 address, records the address 3ffe:1::8590:0a01 to the area for storing the IPv6 address and records the value 0 indicating that the relevant address is a temporary address to the area for storing an attribute of the IPv6 address.

Next, the IPv4-IPv4 translator 1b assigns the address 192.168.100.1 as the exclusive temporary address IPv4 address of the IPv4 network 4 for the IPv6 address 3ffe:1::8590:0a01, records the address 192.168.100.1 to the area for storing the exclusive IPv4 address of the IPv4 network 4 in the entry 2 of the IP address translation table 150b and records the value 0 indicating that the relevant address is a temporary address to the area for storing an attribute of the IPv4 address.

Based on the above result, the packet a is translated to the IPv4 packet of the destination address 192.168.1.1 and transmission source address 192.168.100.1, is transmitted to the IPv4 network 4 and reaches the IPv4 host 42.

Next, a first example in which the IPv4-IPv4 translator 1b receives a defective packet, will be considered. Here, communication is extended to the IPv4 host 23 from the IPv4 network 4 under the condition that communication is extended to the IPv4 host 42 from the IPv4 host 22 and moreover the IPv4 host 23 which is given the IPv4 address 133.11.98.1 is connected to the IPv4 network 2.

Figure 16:
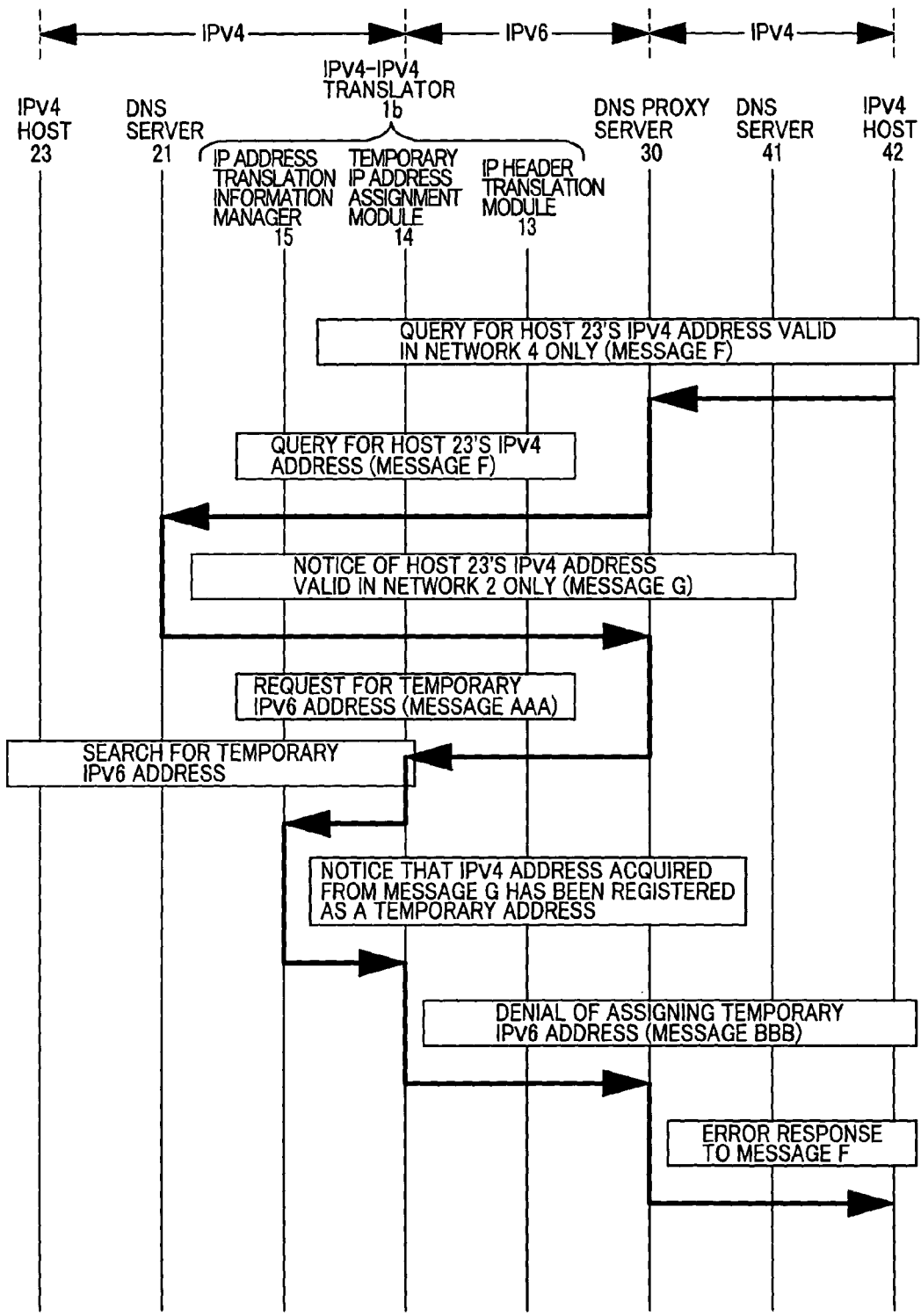
FIG. 16 is a sequence diagram of the processing which occurs when the source address is overlapped with a temporary address while the temporary address of an IPv4 host belonging to a network of a different address system is assigned at the time that the IPv4 host issues a query of the DNS.

FIG. 16 is a sequence diagram showing the procedures for making communication to the IPv4 host 23 from the IPv4 host 42.

The IPv4 host 42 transmits a message inquiring as to the IPv4 address corresponding to the name of IPv4 host 23 (hereinafter, referred to as the "message F") to the DNS proxy server 30. This DNS proxy server 30 transfers the message F to the IPv4 DNS server 21.

The IPv4 DNS server 21 returns the IPv4 address 133.11.98.1 for the name of IPv4 host 23 to the DNS proxy server 30 as a response message for the message F (hereinafter referred to as the "message G").

The DNS proxy server 30 judges, upon reception of the message G, that the IPv4 address 133.11.98.1 in the relevant message is the exclusive address of the IPv4 network 2 and therefore cannot be used in the IPv4 network 4. Accordingly, the DNS proxy server 30 transmits a message to the IPv4-IPv4 translator 1b requesting the temporary IPv6 address for the address 133.11.98.1 (hereinafter referred to as the "message AAA").

When the message AAA is received, the IPv4-IPv4 translator 1b searches the IP address translation table 150b and obtains, from the entry 1, the exclusive IPv4 address 192.168.1.1 of the IPv4 network 2 corresponding to the exclusive IPv4 address 133.11.98.1 of the IPv4 network 4.

Next, as a result of reference to the attribute information of the exclusive IPv4 address of the IPv4 network 2 of the entry 1, it is proved that the value 0 identifying a temporary address is recorded, as opposed to the condition in which the destination address after the IP header translation process has to be the native address. Therefore, the IPv4-IPv4 translator 1b returns, to the DNS proxy server 30, a response to the message AAA suggesting that assignment of the temporary IPv6 address has failed (hereinafter referred to as the "message BBB").

Moreover, the IPv4-IPv4 translator 1b transmits, to the console unit 11, a message requesting assignment of the temporary IPv6 address for the temporary IPv4 address. The DNS proxy server 30, as a result of reception of the message BBB, transmits an error response to the message F (hereinafter referred to as the "message J") to the IPv4 host 42.

The IPv4 host 42, as a result of reception of the message J suspends the communication to the IPv4 host 23 because the response to the address inquiry has been proved as an error response.

Next, a second example in which the IPv4-IPv4 translator 1b receives a defective packet will be considered. Here, a malicious user tries to make access to the IPv4 host 43 connected to the IPv4 network 4 from the IPv4 host 24 connected to the IPv4 network 2 under the condition that communication is extended to the IPv4 host 42 from the IPv4 host 22. The IPv4 host 43 is assumed here to be given the IPv4 address 192.168.1.2.

FIG. 17 is a sequence diagram showing the procedures for making communication to the IPv4 host 43 from the IPv4 host 24 using the false transmission source address 133.11.98.1. It is also assumed, in the IPv4-IPv4 translator 1b, as in the case of FIG. 14, that the exclusive temporary IPv4 address 133.11.98.2 of the IPv4 network 2 for the exclusive IPv4 address 192.168.1.2 of the IPv4 network 4 is registered, through the name solution of the DNS, to the entry 3 of the IP address translation table 150b.

As in the case of FIG. 14, the IPv4 host 24 obtains the exclusive IPv4 address 133.11.98.2 of the IPv4 network 2 of the destination and transmits a false IPv4 packet of the destination address 133.11.98.2 and transmission source address 133.11.98.1 (hereinafter referred to as the "packet d") to the IPv4-IPv4 translator 1b.

Upon reception of the packet d, the IPv4-IPv4 translator 1b searches the IP address translation table 150b and obtains, from the entry 3, the exclusive IPv4 address of the IPv4 network 4 corresponding to the exclusive IPv4 address 133.11.98.2 of the IPv4 network 2.

Moreover, as a result of reference to the attribute information, it is proved that the value 1 indicating the native address is recorded under the normal condition.

Next, the IPv4-IPv4 translator 1b searches the IP address translation table 150b and obtains the exclusive IPv4 address 192.168.1.1 of the IPv4 network 4 corresponding to the exclusive IPv4 address 133.11.98.1 of the IPv4 network 2.

Moreover, as a result of reference to the attribute information of the exclusive Ipv4 address of the IPv4 network 2 of the entry 1, it is proved that the value 0 indicating a temporary address is recorded, as opposed to the condition is in which the transmission source of the receiving packet has to be the native address. Here, the IPv4-IPv4 translator 1b discards the packet d.

In addition, the IPv4-IPv4 translator 1b also transmits, to the console unit 11, a message suggesting that a packet having the temporary IPv4 address as the transmission source address has been received.

Thereafter, if the IPv4 host 24 tries to effect communication with hosts of the IPv4 network 4 using the false transmission source address 133.11.98.1, the packets are discarded by the IPv4-IPv4 translator 1b, as described above. Accordingly, communication with hosts of the IPv4 network 4 using a false address cannot be realized.

The address translator of the present invention is provided with a function to check the translation source address before translation and the destination address after translation at the time of the address translation process. Therefore, this address translator can prevent transmission of packets having no destination and transmission source addresses and thereby it can also prevent giving an adverse effect to the networks.

Moreover, since reception of the relevant packets is communicated to an administrator, the administrator can recognize the erroneous setting of a temporary address used for address translation and address spoofing of hosts having a false address through malicious use of a temporary address and can also quickly take the appropriate measures.

What is claimed is:

1. An address translator comprising:
    an interface connected to a plurality of communication networks including at least a first communication network connected to a first host, and a second communication network connected to a second host; and
    a table for translating addresses used in said first communication network and addresses used in said second communication network,
    wherein the table compromises:
        a plurality of translation rules for each address used in said first communication network and each address used in said second communication network; and
        a discriminator of temporary addresses for each address used in said first communication network and each address used in said second communication network,
        wherein a first discriminator indicates when said address used in said first communication network is a temporary address and said address used in said second communication network is a native address, and
        wherein a second discriminator indicates when said address used in said second communication network is a temporary address and said address used in said first communication network is a native address.

2. The address translator according to claim 1, wherein an address translation rule and a corresponding discriminator are recorded in said table, if the address translation rule is not recorded when said address translation is executed.

3. The address translator according to claim 2, further comprising:
    a means for receiving setting instructions for said address translation rule from said first host or said second host.

4. The address translator according to claim 1, further comprising:
    a memory for storing said table.

5. The address translator according to claim 1, further comprising:
a console unit which displays said table.

6. An address translator comprising:
an interface connected to a plurality of communication networks including at least a first communication network connected to a first host, and a second communication network connected to a second host;
a memory storing each address used in said first communication network, each address used in said second communication network, a plurality of translation rules for each address used in said first communication network, and a plurality of translation rules for each address used in said second communication network, and a discriminator of temporary addresses for each address used in said first communication network and each address used in said second communication network,
wherein a first discriminator indicates when said address used in said first communication network is a temporary address and said address used in said second communication network is a native address, and
wherein a second discriminator indicates when said address used in said second communication network is a temporary address and said address used in said first communication network is a native address; and
a controller for executing translation of each address of said first communication network and each address of said second communication network.

7. The address translator according to claim 6, wherein said controller records, to said memory, an address translation rule and a corresponding discriminator, if the address translation rule is not recorded when said address translation is executed.

8. The address translator according to claim 7, further comprising:
a means for inputting said address translation rule; and
a means for receiving setting instructions of said address translation rule from said first host or said second host.

9. The address translator according to claim 6, further comprising:
a console unit which displays contents of said memory.

10. A method for translating addresses comprising the steps of:
receiving packets transmitted from hosts via a transmission source communication network; and
translating said packets expressed with a protocol of said transmission source communication network to a protocol of a transmission destination communication network of said packets,
wherein said step of translating said protocol further comprises the steps of:
searching an address translation rule between an address in a received packet and an address used in said transmission destination communication network by referring to an address translation table; and
determining whether a transmission source address of a received packet is actually granted to said host or not by referring to a discriminator of temporary addresses for each address used in said transmission source communication network and each address used in said transmission destination communication network,
wherein a first discriminator indicates when said address used in said transmission source communication network is a temporary address and said address used in said transmission destination communication network is a native address, and
wherein a second discriminator indicates when said address used in said transmission destination communication network is a temporary address and said address used in said transmission source communication network is a native address.

11. The method of translating addresses according to claim 10, further comprising a step of:
discarding said received packet if the source address of said received packet is not actually granted to said host.

12. The method for translating addresses according to claim 11, further comprising a step of:
notifying that said received packet has been discarded to said transmission source communication network.

13. The method for translating addresses according to claim 10, further comprising a step of:
assigning the address used in said transmission destination communication network if it is proved as a result of said search that the address used in said transmission destination communication network is not yet assigned to said host.

14. The method for translating addresses according to claim 13, further comprising the step of:
recording the transmission source address of said packet, said assigned address, and the discriminator suggesting that said assigned address is a temporary address to said address translation table.

15. The method for translating addresses according to claim 14, wherein the newly received packet is discarded when the packet having said assigned temporary address which is set as the destination address through said translation of protocol is newly received.

16. The method for translating addresses according to claim 14, wherein occurrence of a fault is notified to said transmission source and transmission destination communication network when the address corresponding to the discriminator suggesting said temporary address is the native address of the host registered to said transmission source communication network or said transmission destination communication network.

17. The method for translating addresses according to claim 13, comprising the steps of:
receiving a request inquiring said destination address used in the transmission destination communication network from said transmission source communication network by designating the name of destination of the packet;
transferring said inquiry request to a server storing the corresponding relationship between said address and name; and
receiving a response to said inquiry request from said server,
wherein said temporary address is assigned upon reception of said response from said server.

18. The method for translating addresses according to claim 17, further comprising a step of:
registering the discriminator suggesting that said assigned address is the temporary address to said address translation table.

19. The method for translating addresses according to claim 17, wherein occurrence of a fault is notified to said transmission source communication network when the discriminator suggesting that the address notified with the response from said server is the temporary address is registered.

20. The method for translating addresses according to claim 10, wherein said translation of protocol is executed in the timing that setting instructions of address translation rule from said host are generated.

* * * * *